United States Patent
Chen et al.

(10) Patent No.: US 11,756,231 B2
(45) Date of Patent: Sep. 12, 2023

(54) METHOD AND APPARATUS FOR SCALE CALIBRATION AND OPTIMIZATION OF A MONOCULAR VISUAL-INERTIAL LOCALIZATION SYSTEM

(71) Applicant: Midea Group Co., Ltd., Foshan (CN)

(72) Inventors: Yi Chen, San Jose, CA (US); Ke Huang, San Jose, CA (US); Wei Xi, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/362,832

(22) Filed: Jun. 29, 2021

(65) Prior Publication Data

US 2022/0414932 A1    Dec. 29, 2022

(51) Int. Cl.
*G06T 7/80* (2017.01)
*H04N 5/247* (2006.01)
(Continued)

(52) U.S. Cl.
CPC ............ *G06T 7/80* (2017.01); *B25J 5/007* (2013.01); *B25J 9/1692* (2013.01);
(Continued)

(58) Field of Classification Search
None
See application file for complete search history.

(56) References Cited

U.S. PATENT DOCUMENTS 11,521,332 B1    12/2022    Chen et al.
2011/0054686 A1    3/2011    Lee et al.
(Continued)

FOREIGN PATENT DOCUMENTS

CN    107643186 A    1/2018
CN    108638053 A    10/2018
(Continued)

OTHER PUBLICATIONS

Midea Group Co., Ltd., ISRWO, PCT/CN2022/072114, dated Apr. 13, 2022, 11 pgs.
(Continued)

*Primary Examiner* — Samuel D Fereja
(74) *Attorney, Agent, or Firm* — Morgan, Lewis & Bockius LLP

(57) ABSTRACT

The method and system disclosed herein presents a method and system for capturing, by a camera disposed on a device moving in an environment, a plurality of image frames recorded in a first coordinate reference frame at respective locations within a portion of the environment in a first time period; capturing, by an inertial measurement unit disposed on the device, sets of inertial odometry data recorded in a second coordinate reference frame; determining a rotational transformation matrix that corresponds to a relative rotation between the first reference frame and the second reference frame; and determining a scale factor from the matching pairs of image frames. The rotational transformation matrix defines an orientation of the device, and the scale factor and the rotational transformation matrix calibrate the plurality of image frames captured by the camera.

17 Claims, 17 Drawing Sheets

(51) Int. Cl.
- *G01C 21/16* (2006.01)
- *B25J 9/16* (2006.01)
- *B25J 5/00* (2006.01)

(52) U.S. Cl.
CPC ............... *G01C 21/1656* (2020.08); *G06T 2207/10016* (2013.01); *G06T 2207/30244* (2013.01)

(56) References Cited

U.S. PATENT DOCUMENTS

| 2020/0042010 | A1 | 2/2020 | Nakajima |
| 2020/0192388 | A1* | 6/2020 | Zhang ................... G06V 20/10 |
| 2022/0082386 | A1* | 3/2022 | Roumeliotis ............ G05D 1/00 |
| 2022/0299321 | A1* | 9/2022 | Zhao .................... G01C 21/183 |

FOREIGN PATENT DOCUMENTS

| CN | 109414145 A | 3/2019 |
| CN | 110946511 A | 4/2020 |
| CN | 111578937 A | 8/2020 |
| CN | 111707261 A | 9/2020 |
| CN | 112649016 A | 4/2021 |
| CN | 112740274 A | 4/2021 |

OTHER PUBLICATIONS

Midea Group Co., Ltd., ISRWO, PCT/CN2022/072138, dated Apr. 2, 2022, 10 pgs.

* cited by examiner

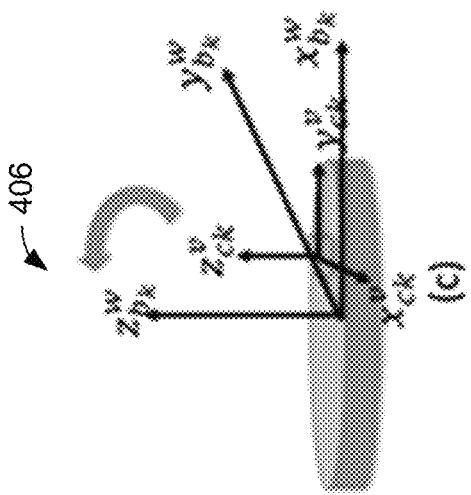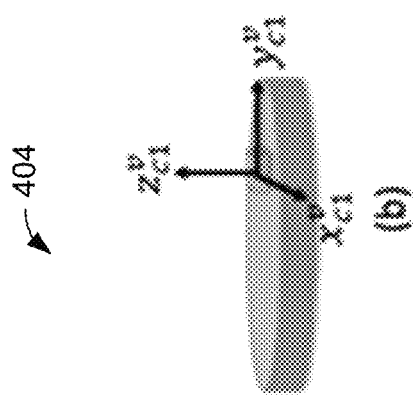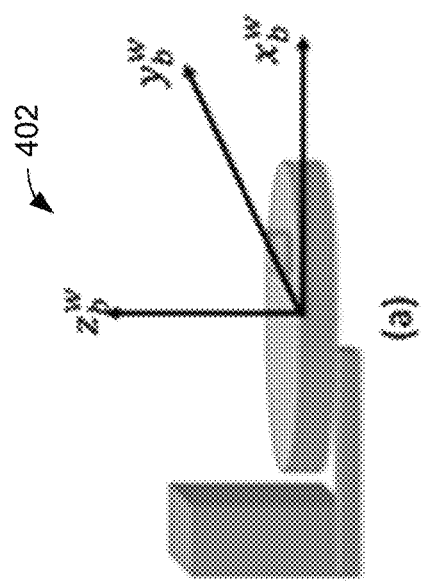
Figure 4

900

902 Capture, by a camera disposed on a device moving in an environment, a plurality of image frames recorded in a first coordinate reference frame at respective locations within a portion of the environment in a first time period

904 Capture, by an inertial measurement unit disposed on the device, sets of inertial odometry data recorded in a second coordinate reference frame, the sets of inertial odometry data corresponding to the plurality of image frames at the respective locations, in the first time period

906 Store in a buffer, a matching pair of an image frame and a set of inertial odometry data that satisfies first criteria

908 In accordance with a determination that a threshold number of matching pairs of image frames and inertial odometry data have been stored:

> 910 Determine a rotational transformation matrix that corresponds to a relative rotation between the first coordinate reference frame and the second coordinate reference frame > 912 Determine a scale factor from the matching pairs of image frames, wherein the rotational transformation matrix defines an orientation of the device, and the scale factor and the rotational transformation matrix calibrate the plurality of image frames captured by the camera

Figure 9

METHOD AND APPARATUS FOR SCALE CALIBRATION AND OPTIMIZATION OF A MONOCULAR VISUAL-INERTIAL LOCALIZATION SYSTEM

FIELD OF THE TECHNOLOGY

The present disclosure generally relates to the technology of simultaneous localization and mapping (SLAM) in an environment, and in particular, to systems and methods for characterizing physical environments and localizing a mobile robot with respect to its environment using image data.

BACKGROUND OF THE TECHNOLOGY

Localization, place recognition, and environment understanding allow a mobile robot to become a fully autonomous or semi-autonomous system in an environment. Simultaneous localization and mapping (SLAM) is a method that builds a map of an environment and simultaneously estimates the pose of a mobile robot (e.g., using the estimated pose of its cameras) in the environment. SLAM algorithms allow the mobile robot to map out unknown environments and localize itself in the environment to carry out tasks such as path planning and obstacle avoidance.

SUMMARY

Monocular camera based localization technology extracts information from captured consecutive frames of the surrounding environment, such as features (points and lines) or raw pixel values to solve the relative pose (e.g., orientation and translation) between those frames by solving a 3D geometry problem using, for example, epipolar geometry or perspective-n-point. Since a single RGB camera cannot measure depth of the scenes (e.g., measuring a distance of an object captured in a camera frame directly), so the distance from associated features to the camera centers in two related frames is unknown when solving using epipolar geometry. Using scale calibration, a solved translation between the two related frames is valid up-to-scale, (e.g., a translation of the solution is valid after multiplying with an arbitrary scale) Prior to scale calibration, there is a scale ambiguity issue for monocular camera based localization technology). In some embodiments, scale refers to the physical distance between two frame poses. Without accurate scale estimation, the monocular camera based localization method may not be able to provide accurate location information to its host device.

As a result, more efficient methods and systems for providing scale information to visual data collected from a monocular camera are highly desirable. The methods and systems described here do not involve formulating and solving factor-graph-based optimization problems using relative pose change between frames measured by inertial measurement units. As a result, the present methods and system are less susceptible to numerical instability and have lower computational costs, resulting in more accurate localization solution and faster responses from the mobile robot.

As disclosed herein, one solution relies on using a monocular camera, a MEMS inertial sensor, wheel encoders and an optical flow sensor. Such a solution takes advantages of a multi-sensory scheme to cross examine poses from different odometry modules. The methods and systems also detect and reject data collected during wheel slip events, which may be common in mobile robot applications that involve traversal across different terrains, such as carpet, wooden floor, tile floor, etc. By doing so, the methods and systems effectively improve the localization accuracy by rejecting the accumulated error from wheel odometry data accumulated during slip events. In addition, accurately calculated poses from various odometry sources, the backend of the algorithm used for localization also performs the scale calibration and the online optimization to recover and dynamically adjust the scale for visual-odometry, and asynchronously fuses the poses to obtain robust and accurate pose estimation of the robot.

The methods and systems described here have several advantages. First, the described methods and systems are computationally efficient and stable, because they do not involve formulating factor-graph-based optimization problems, making them more well-suited for real-time applications. Second, scale (associated with images recorded by the monocular camera) can be more accurately recovered and be adjusted dynamically. The scale calculation is improved by excluding data measured during wheel slippage events (e.g., when the wheels of the mobile robot are recorded as spinning, but a displacement of the mobile robot does not substantially change), making the overall localization algorithm more adaptive to scenes that have different scales. Finally, the multi-sensory scheme used in the systems described here allows different types of sensors to be replaced and deployed, making the systems and methods flexible and scalable for different applications.

The systems and methods described here provide stable, accurate online scale calibration (e.g., online scale calibration is performed while the mobile robot is operating or running) and optimization with low computational burden. The systems and methods described here use high frequency inertial-odometry and optical tracking sensor (OTS) odometry information to perform wheel slip detection and visual odometry (VO) pose outlier rejection, resulting in a more accurate odometry pose for scale calibration and optimization. The methods and systems described here are adaptive to scenes with variant scale, and use a scale calibration and optimization strategy to solve the scale ambiguity issue associated with monocular camera visual odometry. The methods and systems described here adopt a loosely coupled sensor fusion framework, allowing changes to be made to the SLAM algorithm as well as sensors, providing more flexibility.

According to a first aspect of the present application, a method of localizing a mobile robot includes: capturing, by a camera disposed on a device moving in an environment, a plurality of image frames recorded in a first coordinate reference frame at respective locations within a portion of the environment in a first time period; capturing, by an inertial measurement unit disposed on the device, sets of inertial odometry data recorded in a second coordinate reference frame, the sets of inertial odometry data corresponding to the plurality of image frames at the respective locations, in the first time period; storing in a buffer, a matching pair of an image frame and a set of inertial odometry data that satisfies first criteria; in accordance with a determination that a threshold number of matching pairs of image frames and inertial odometry data have been stored: determining a rotational transformation matrix that corresponds to a relative rotation between the first reference frame and the second reference frame; and determining a scale factor from the matching pairs of image frames, wherein the rotational transformation matrix defines an orientation of the device, and the scale factor and the rotational transformation matrix calibrate the plurality of image frames captured by the camera.

According to a second aspect of the present application, an electronic device includes one or more processors, memory and a plurality of programs stored in the memory. The programs include instructions, which when executed by the one or more processors, cause the electronic device to perform the methods described herein.

According to a third aspect of the present application, a non-transitory computer readable storage medium stores a plurality of programs for execution by an electronic apparatus having one or more processors. The programs include instructions, which when executed by the one or more processors, cause the electronic device to perform the methods described herein.

In addition to reducing computation complexity, and improving speed and accuracy of localization of mobile robots in an environment, as described above, various additional advantages of the disclosed technical solutions are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 4 depicts the different coordinate systems used by different sensor modules, in accordance with some embodiments.

FIG. 9 illustrates an example flowchart for a process of localizing a mobile robot in an environment in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1A:
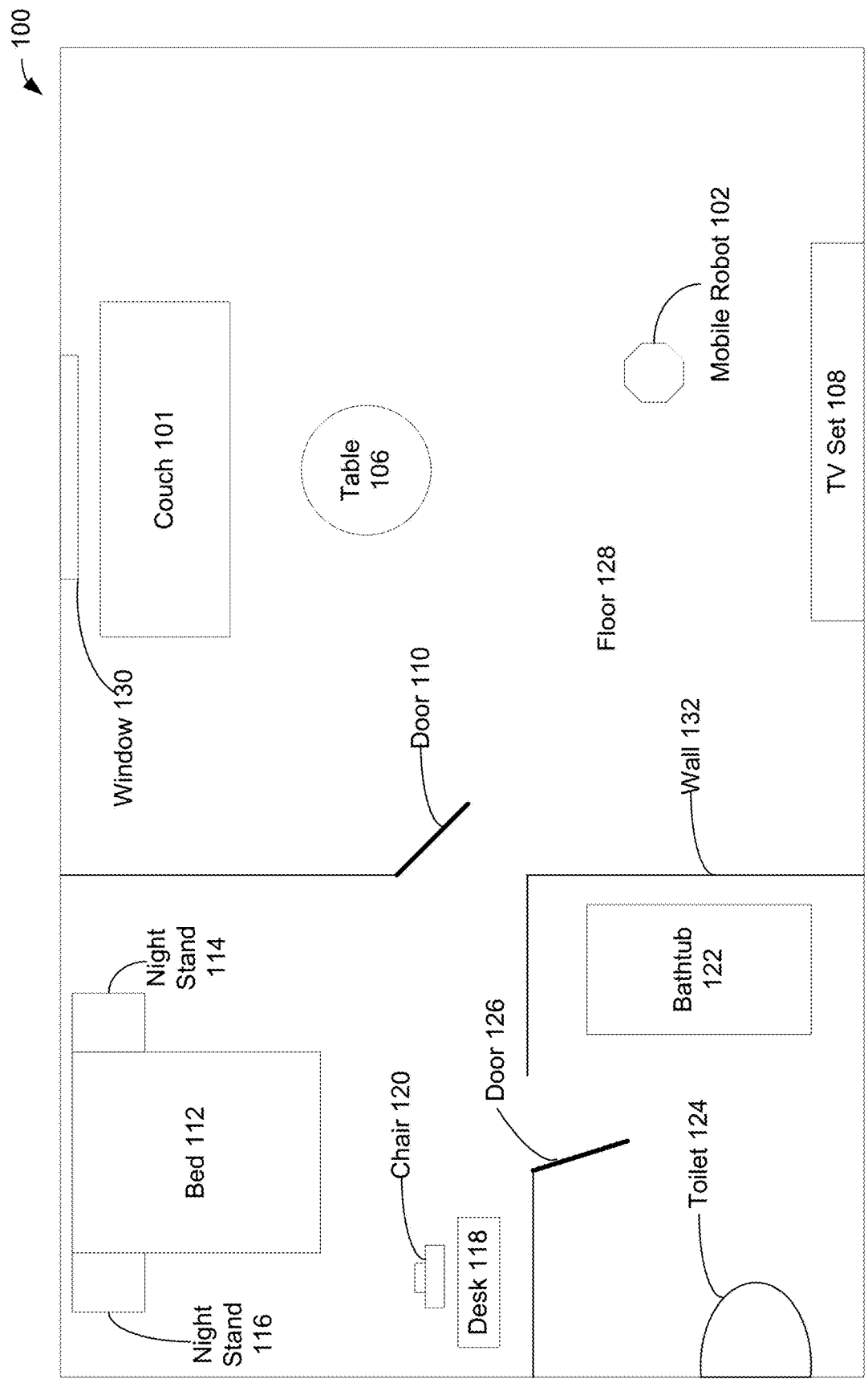
FIG. 1A is a schematic diagram of a layout of an environment in which a mobile robot navigates in accordance with some embodiments.

FIG. 1A is a schematic diagram of a layout of an example environment 100 in which a mobile robot navigates in accordance with some embodiments. In FIG. 1, for example, the environment 100 is an indoor environment including a number of connected rooms separated by walls. The environment 100 includes both structural objects (e.g., window 130, floor 128, doors 110 and 126, and wall 132) and non-structural objects (e.g., couch 101, table 106, TV set 108, bed 112, night stands 114 and 116, chair 120, desk 118, toilet 124, and bathtub 122). In some embodiments, the environment 100 is an outdoor environment, and optionally includes both structural objects (e.g., buildings, landmarks, streets, etc.) and non-structural objects (e.g., trees, mailboxes, street signs, cars, picnic tables, tents, etc.). In some embodiments, the environment 100 (or portions of the environment 100) is digitally captured (e.g., by RGB color cameras, black and white cameras, infrared cameras, depth cameras, etc.) and the structural and non-structural objects are detected and identified as semantic objects from the captured images using various image processing and object segmentation and/or recognition methods. For example, the semantic annotation of the objects can be achieved using algorithms for pixel-level 2D semantic segmentation (e.g., deep neural networks). Each of the semantic objects includes one or more semantic annotations and descriptors, such as categorical labels, appearance descriptors, shape descriptors, size attributes, material attributes, 3D position and orientation, etc. For example, the semantic object representing the chair 120 captured on an image of a portion of the environment 100 may include the following semantic annotations and descriptors:

TABLE 1

Semantic Annotation and Descriptors for a Chair Object

| | |
|---|---|
| Object ID | 001 |
| Object Type | Chair |
| Group ID | Living room |
| Type | Static |
| Affordance | Movable |
| Functionality | Sitting |
| Attributes | Wood, upholstered, multiple legs |
| Appearance | Heavy, medium size |
| Position on image | (8, 2.5, 0), distribution N (0.2, 0.2, 0.2) |
| 3D bounding box | (0.8, 0.8, 0.5), orientation (0, 0, 0) |

In some embodiments, a mobile robot 102 (e.g., an autonomous or semi-autonomous cleaning device, delivery device, transportation device, surveillance device, etc.) navigates in the environment (e.g., on the floor 128 in the environment 100) to perform preprogrammed tasks (e.g., vacuuming/mopping the floor, performing security checks, delivering food items or medication, and/or traveling to a charging station or user-selected destination, etc.). In some embodiments, the mobile robot has onboard processing capability to process images, and uses the object semantic information to self-localize in the environment. In some embodiments, the mobile robot includes communication equipment to communication with a host device (e.g., a control station, a home station, a remote server, etc.) to transmit image data to and receive localization results from the host device. In some embodiments, the mobile robot 102 is equipped with both a front view camera (e.g., forward facing) and a top view camera (upward facing) to capture images at different perspectives in the environment 100. In some embodiments, the mobile robot 102 is further equipped with rear view camera, and/or downward view camera to capture images from different perspectives in the environment 100. In some embodiments, the mobile robot 102 sends the captured images to an onboard computer (e.g., or a remote computer via wireless connection) to extract object semantic information for localization purpose (e.g., computing the robot or the robot's camera's pose in the environment 100). In some embodiments, the mobile robot retrieves information needed for localization from a host device, as needed. In some embodiments, some or all of the steps described with respect to the mobile robot can be performed by a host device in communication with the mobile robot.

Figure 1B:
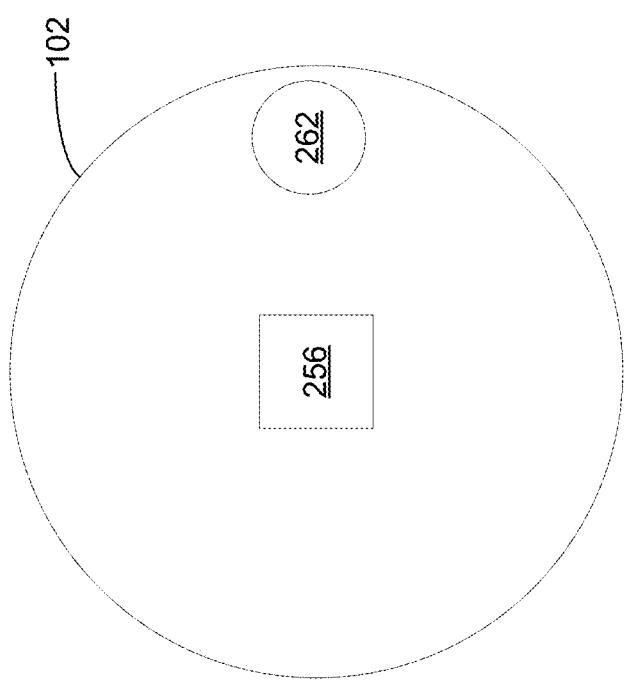
FIG. 1B is a schematic diagram of a mobile robot that includes an inertial measurement unit (IMU) and a camera, in accordance with some embodiments.

FIG. 1B is a schematic diagram of a mobile robot that includes an inertial measurement unit (IMU) and a camera, in accordance with some embodiments. In some embodiments, the mobile robot 102 includes an IMU 256 mounted to a center location of the mobile and a camera 262 offset from the IMU 256.

Figure 2A:
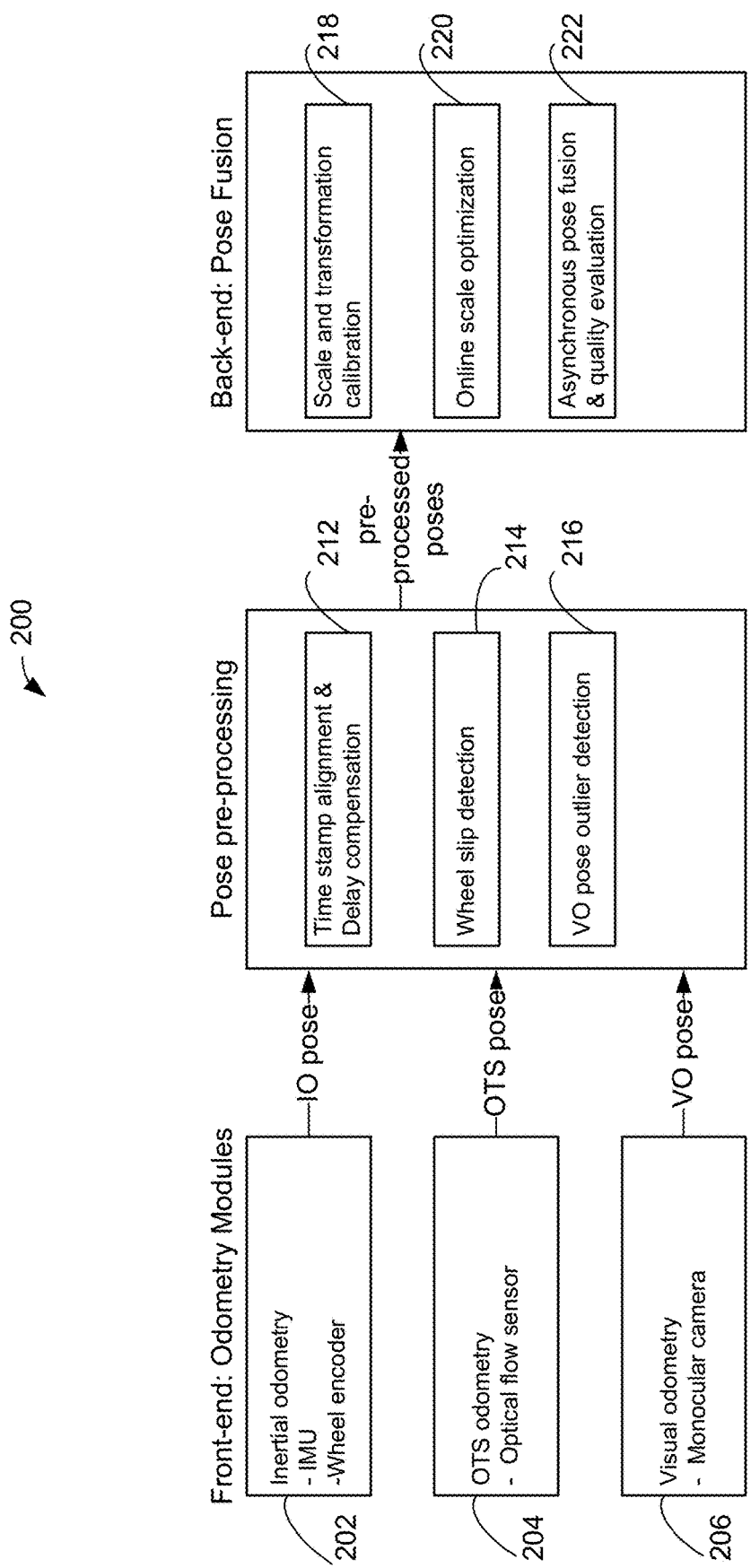
FIG. 2A is a schematic diagram of a system that provides localization information to a mobile robot in accordance with some embodiments.

FIG. 2A is a schematic diagram of a system that provides localization information to a mobile robot in accordance with some embodiments. A system 200 includes three different functional components. A front-end portion of the system includes a number of odometry modules, each of which detects a pose of the mobile robot. The poses detected by the front-end are pre-processed into pre-processed poses. A back-end of the system 200 conducts pose fusion using the pre-processed poses to derive localization information using the data collected by the different odometry modules.

In some embodiments, the odometry modules includes an inertial odometry ("IO") module 202, an optical tracking sensor odometry module 204, and a visual odometry module 206. The inertial odometry s module 202 includes an inertial measurement unit (IMU). The IMU measures and reports one or more of a specific force, angular rate, and orientation of the mobile robot, using a combination of one or more of accelerometers, gyroscopes, and magnetometers. The inertial odometry module 202 also includes a wheel encoder. A wheel encoder counts the number of times a motor has rotated. Wheel encoder readings can be used to calculate the distance that the robot has driven or turned.

The optical tracking sensor ("OTS") odometry module 204 includes an optical flow sensor. An optical flow sensor is a vision sensor capable of measuring optical flow or visual motion and outputting a measurement based on optical flow. Optical flow can also be defined as the distribution of apparent velocities of movement of brightness pattern in an image. In some embodiments, an optical tracking sensor uses an infrared (IR) emitting LED and IR receiver pair to detect a reflective surface in front of the sensor.

The visual odometry ("VO") module 206 includes a monocular camera. The monocular camera captures frames of images of its surrounding at the camera's frame rate (e.g., 10 frames per second, 20 frames per second, etc.). For example, the monocular camera is an on-board camera of the mobile robot and the images from the monocular camera are captured from the vantage points of a mobile robot navigating in the environment 100.

In some embodiments, the IO module 202, the OTS module 204, and VO module 206 captures odometry data at different rates (e.g., the IMU detects and reports inertial measurements at 50 Hz, the wheel encoder reports the encoder reading at 30 Hz, the monocular camera captures image frames at 10 frames per second, and the OTS system 204 detects and reports optical flow information at 30 Hz).

Effectively extracting and combining the odometry data received from each of the odometry modules of the front end helps to improve a quality of the localization operation (e.g., more accurate localization by using multiple sensors collecting different types of measurements). The pose of the mobile robot 102 describes the state of the mobile robot (e.g., its position, orientation). The IO module 202 includes sensors (e.g., the IMU and wheel encoder) that report a pose of the mobile robot from an inertial odometry perspective. The output of the IO module 202 is an IO pose of the mobile robot 102. The OTS module 204 includes one or more sensors (e.g., the optical flow sensor) that report a pose of the mobile robot from an optical tracking perspective. The output of the OTS module 204 is an OTS pose of the mobile robot 102. Similarly, the VO module 206 includes one or more sensors (e.g., the monocular camera) that report a pose of the mobile robot from a visual perspective. The output of the VO module 206 is an VO pose of the mobile robot 102.

Pre-processing the IO pose, the OTS pose, and the VO pose includes a step 212 of time stamp alignment and delay compensation. The step 212 of time stamp alignment and delay compensation helps to align poses across different modules that may be at acquired at different times and/or at different frequency or rates. For example, IO poses may be reported at a higher rate (e.g., 50 Hz) compared to VO poses. In some embodiments, the step 212 helps to match a VO pose to the IO pose closest to it, and compensates for any time delay between the VO pose and the IO pose, and to align the time stamp of the IO pose and the VO pose.

A step 214 for detecting wheel slip is also carried out during pose pre-processing. Further details of wheel slip detection are provided in reference to the description of FIGS. 6-8. Wheel slip can occur when the motor of the mobile robot 102 rotates but the mobile robot 102 does not move or moves less than a first distance threshold (e.g., the first distance threshold is less than five inches, the first distance threshold is less than two inches). Wheel slip detection can help in recognizing when the mobile robot is trapped in a particular region or location. In accordance with a determination that a wheel slip is detected, the IO poses, OTS poses and VO poses detected or received while the wheel slip is detected are discarded and/or not relayed to the back end for pose fusion.

A step 216 for detecting VO pose outlier is performed on the VO poses during pose pre-processing. Further details of VO pose outlier detection are provided in reference to the description of FIG. 7C. VO pose outliers can occur when noise, other disturbances, or instrumental issues (e.g., hardware issues, software issues) cause the camera to record an image frame that deviates significantly from an actual condition of the environment (e.g., extreme values of noise or from erroneous measurements). Random sample consensus (RANSAC) is an example of an outlier detection method. In accordance with a determination that a VO pose outlier is detected, the outlier VO pose is discarded and/or not relayed to the back end for pose fusion.

Once the pre-processing aligns the time stamps of the IO poses, the OTS poses, and the VO poses and the delay of between these poses are compensated, the poses that pass through the wheel slip and VO pose outlier detections are delivered to the back end for pose fusion. Pose fusion includes a step 218 of scale and transformation calibration. More details of the scale and transformation calibration is provided in the description below and the description of FIGS. 3A-5B. Once an initial scale is determined from the step 218, the scale is optimized in a step 220. The process of determining a pose of the mobile robot 102 ends after a step 222 in which asynchronous pose fusion is conducted, and a quality evaluation is done on the fused pose.

Figure 2B:
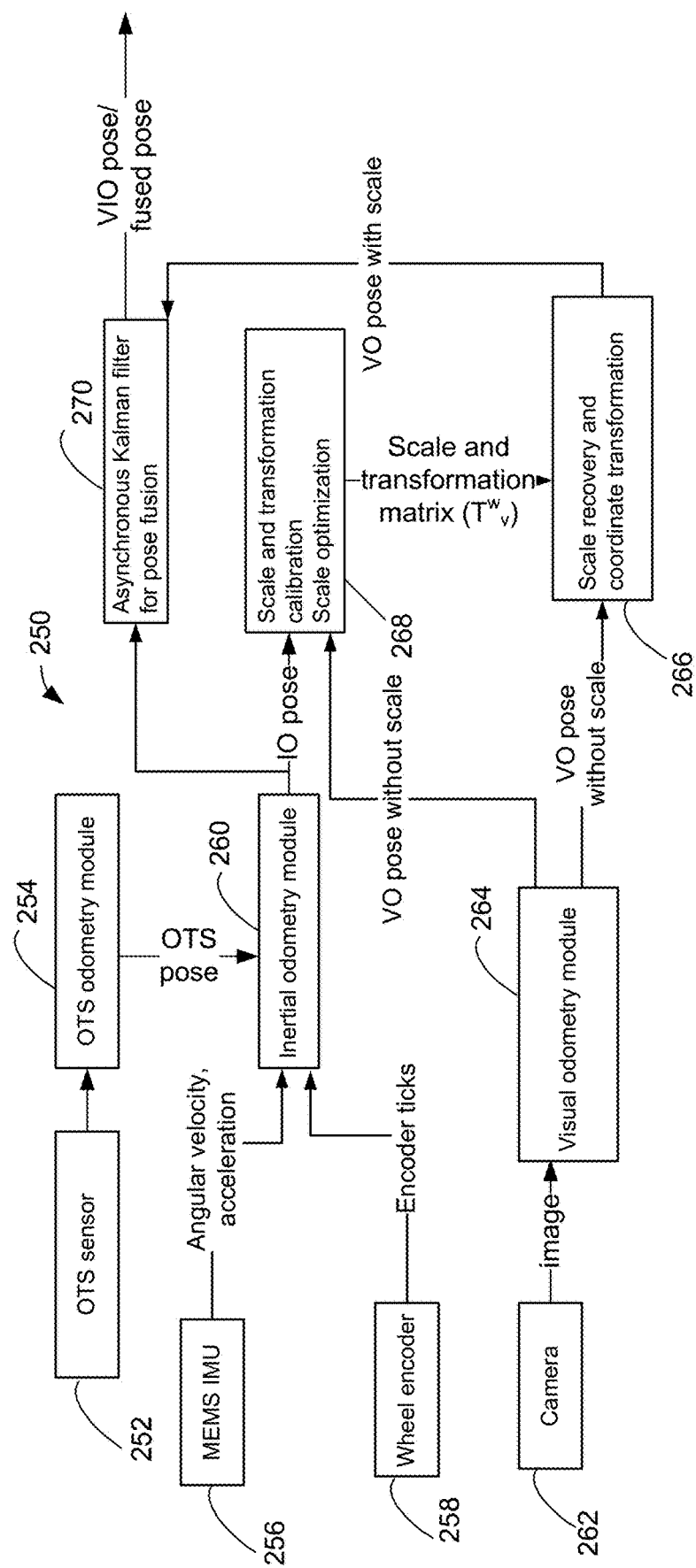
FIG. 2B is a schematic diagram of a system that provides localization information to a mobile robot in accordance with some embodiments.

FIG. 2B is a schematic diagram of a system that provides localization information to a mobile robot in accordance with some embodiments. FIG. 2B shows a system 250 used to provide localization information to the mobile robot 102. In the system 250, an OTS sensor provides measurement values to an OTS odometry module 254, which provides the derived OTS pose to an inertial odometry module 260. An IMU, for example, a MEMS (micro-electromechanical system) IMU 256 provides inertial odometry data, for example, angular velocity and acceleration values, to an inertial odometry module 260. A wheel encoder 258 also provides encoder ticks that include a number of motor rotations of the mobile robot. Information about the encode ticks is provided to the IO module 260. A camera 262 captures an image (e.g., at a frame rate of the camera) of the surrounding of mobile robot and sends the information to the visual odometry module 264. A component 266 that performs scale recovery and coordinate transformation receives an input VO pose from the VO module 264 that does not include scale. An output of the component 266 is a VO pose that includes scale. The VO pose that includes scale is provided to a component 270 that includes an asynchronous Kalman filter for pose fusion.

The VO module 264 also sends a copy of the VO pose without scale to a component 268. The component 268 receives, in addition to the VO pose from the VO module 265, an IO pose from the IO module 260. The component 268 computes, based on the received VO pose and the IO pose, a scale for the VO pose and calculates a transformation matrix $T_v^w$ that transforms the coordinate systems between the IO pose and the VO pose. The component 268 also continues to optimize the scale as additional IO poses, VO poses, and OTS poses are recorded by the system 250.

The component 270 receives the IO pose from the IO module 260 and the VO pose, which includes scale information, from the component 266. The component 270 computes a fused (or VIO pose).

Figure 3A:
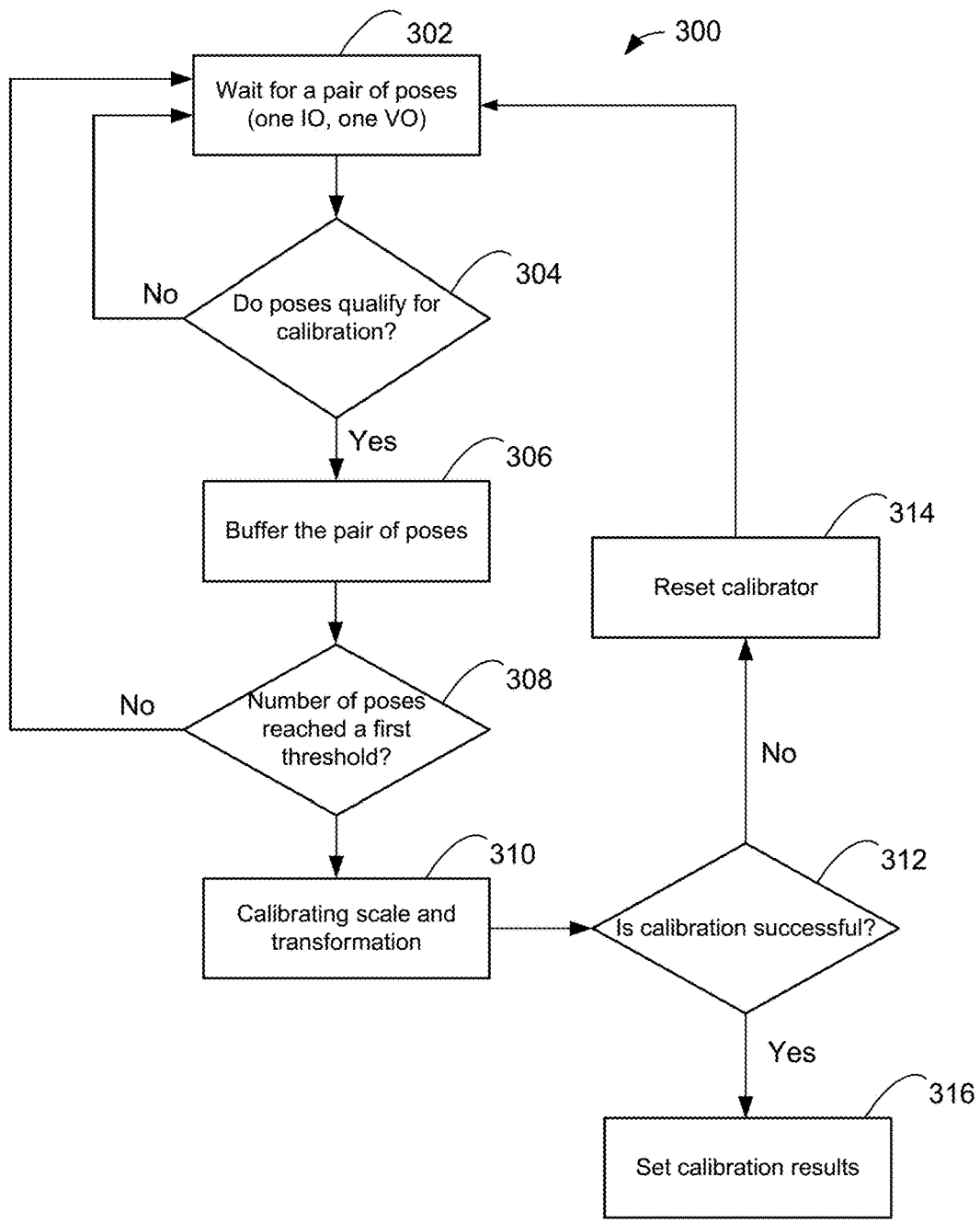
FIG. 3A depicts an example process flow for calibrating a VO pose to a corresponding IO pose, in accordance with some embodiments.

FIG. 3A depicts an example process flow for calibrating a VO pose to a corresponding IO pose, in accordance with some embodiments. A process 300 for calibrating a pair the includes one VO pose and one corresponding IO pose corresponding to the VO pose begins at a step 302 by waiting for the pair of poses. In some embodiments, the process 300 is executed at the component 268. After receiving the pair of poses (e.g., a VO pose without scale from the VO module 264, an IO pose from the IO module 260), a determination is made at a step 304 if the received poses qualify for calibration. In accordance with a determination that the received poses do not qualify for calibration, the process 300 returns to the step 302 to wait for a next pair of poses. Criteria for qualification includes, for example, a minimum and/or a maximum distance between IO poses. Ensuring that a minimum distance exists between IO poses helps to ensure that the mobile robot 102 is not stuck in a position (e.g., measurements are collected during a wheel slippage). While limiting a distance between IO poses to be no greater than a maximum distance threshold allows for a better and more accurate localization by minimizing jumps between the acquired poses. Since IO poses may accumulate drift as a function of distance traveled, having poses that are close by reduces the chance that the IO poses used for calibration would have significant drift, and therefore improves the calibration accuracy.

In accordance with a determination that the received poses qualify for calibration, the pair of poses are buffered at a step 306. In accordance with a determination that the number of buffered pairs of poses reached a first threshold (e.g., ten pairs of buffered, qualified poses, twenty pairs of buffered, qualified poses, thirty pairs of buffered, qualified poses) in a step 308, the process begins the scale calibration and the computing the transformation matrix at a step 310. In accordance with a determination at a step 312 that the calibration results from the step 310 is successful, the process 300 concludes at a step 316 and the calibration results are applied to the measured VO data. In accordance with a determination at a step 312 that the calibration results from the step 310 is not successful, the calibrator is reset at a step 314. The calibrator includes the buffer used in the step 306 and other stored data used in the step 310 for calculating the scale and the transformation matrix. When resetting occurs, it is assumed the data collected previously was not suited for calibration, and the whole calibration process will start again. All the previously collected poses will be purged from the buffer and discarded.

Figure 3B:
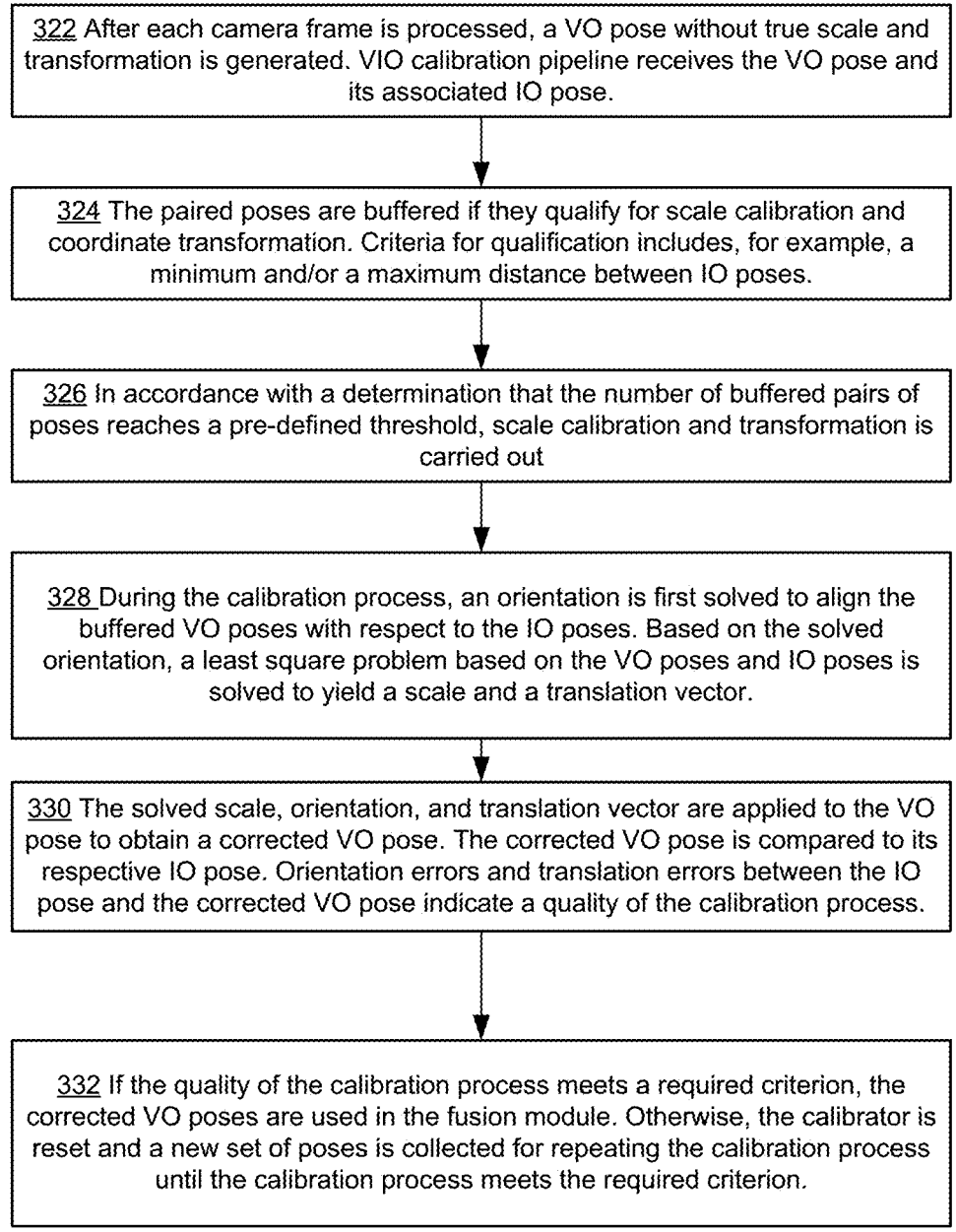
FIG. 3B is a flow diagram illustrating an example process of calibrating a scale factor and orientation in accordance with some embodiments.

FIG. 3B is a flow diagram illustrating an example process of calibrating a scale factor and orientation in accordance with some embodiments. FIG. 3B shows a flow chart 320 of the steps associated with the process 300. After each camera frame is processed (e.g., by the VO module 264), a VO pose without true scale and transformation is generated. VIO calibration pipeline (e.g., the component 268) receives (322) the VO pose and its associated 10 pose.

The paired poses are buffered (324) if they qualify for scale calibration and coordinate transformation. Criteria for qualification includes, for example, a minimum and/or a maximum distance between IO poses. In accordance with a determination that the number of buffered pairs of poses reaches a pre-defined threshold, scale calibration and transformation is carried out (326). During the calibration process, an orientation is first solved to align the buffered VO poses with respect to the IO poses. Based on the solved orientation, a least square problem based on the VO poses and IO poses is solved (328) to yield a scale and a translation vector. The solved scale, orientation, and translation vector are applied to the VO pose to obtain a corrected VO pose. The corrected VO pose is compared (330) to its respective IO pose. Orientation errors and translation errors between the IO pose and the corrected VO pose indicate a quality of the calibration process. If the quality of the calibration process meets a required criterion, the corrected VO poses are used (332) in the fusion module. Otherwise, the calibrator is reset and a new set of poses is collected for repeating the calibration process until the calibration process meets the required criterion.

FIG. 4 depicts the different coordinate systems used by different sensor modules, in accordance with some embodiments. The IMU (e.g., IMU in the inertial odometry module 202, MEMS IMU 256) of the mobile robot records measurements in a world coordinate reference system 402 along three orthogonal axes ($x_b^w$, $y_b^w$, $z_b^w$). The camera (e.g., monocular camera in the visual odometry module 206, the camera 262) of the mobile robot records measurements in a visual coordinate reference system 404 along three orthogonal axes ($x_c^v$, $y_c^v$, $z_c^v$). A supposition 406 shows both the world coordinate reference system 402 and the visual coordinate reference system 404. To align these two coordinate reference systems, a rotation (e.g., shown by the thick arrow, described below as $R_v^w$) operation, a scaling (e.g., by a scaling parameter s) operation, and a translation (e.g., $P_v^w$) n operation are performed, details of which are described below.

Scale and Coordinate Transformation

In the following description, a general pose transformation in 3D space is denoted by a 4-by-4 homogenous coordinate, such as:

$$T = \begin{bmatrix} R & P \\ 0 & 1 \end{bmatrix} \quad (1)$$

where R is a 3-by-3 rotation matrix, P is a 3-by-1 translation vector, and 0 and 1 are both scalars. Subscripts and superscripts are used to denote the coordinate and its corresponding reference. For example, w represents the world coordinate reference frame, v represents the visual coordinate reference frame, b represents robot body frame and c represents camera frame. Therefore, $T_b^w$ refers to the pose of robot body frame referenced to the world coordinate reference frame. Subscripts are used with the above symbols to represents a temporal order of the poses. For instance, $T_{b_k}^w$ means the pose of the robot body frame referenced to the world coordinate reference frame when $k_{th}$ image is taken, etc. Here, the definitions of each coordinate system and how poses are represented when referenced to each coordinate system are provided, but does not specify if a pose comes from IO module or VO module.

The goal of calibration is to solve a scale and coordinate transformation to restore the true scale of the VO pose and then transform the reference frame of the VO pose from visual coordinate reference frame to world coordinate reference frame. Specifically, we compose a least square problem by the following:

$$T_{b_k}^w = T_v^w T_{c_k}^v T_{b_k}^{c_k} \quad (2)$$

where $T_{b_k}^{c_k}$ is the pose of the robot body frame referenced to the camera frame when $k_{th}$ image is taken, which is substantially time-invariant absent changes to the positioning of the monocular camera or the IMU on-board the mobile robot 102. $T_{c_k}^v$ is the pose of the camera frame referenced to the visual coordinate reference frame when $k_{th}$ image is taken.

$$T_{b_k}^w = \begin{bmatrix} R_{b_k}^w & P_{b_k}^w \\ 0 & 1 \end{bmatrix} \quad (3)$$

$$T_v^w = \begin{bmatrix} R_v^w & P_v^w \\ 0 & 1 \end{bmatrix} \quad (4)$$

Where $T_v^w$ is the pose of the visual coordinate reference frame referenced to the world coordinate reference frame, which is substantially time-invariant absent changes to the positioning of the monocular camera or the IMU on-board the mobile robot 102.

$$T_{c_k}^v = \begin{bmatrix} R_{c_k}^v & sP_{c_k}^v \\ 0 & 1 \end{bmatrix} \quad (5)$$

where s (an unknown to be solved) is the scale factor to be multiplied to the translation vector $P_{c_k}^V$ of the camera frame referenced to the visual coordinate reference frame when the $k_{th}$ image is taken to resolve scale ambiguity associated with the image.

$$T_{b_k}^{c_k} = \begin{bmatrix} R_{b_k}^{c_k} & P_{b_k}^{c_k} \\ 0 & 1 \end{bmatrix}$$

where $T_{b_k}^{c_k}$ is the pose of the robot body frame referenced to the camera frame when $k_{th}$ image is taken, which is substantially time-invariant absent changes to the positioning of the monocular camera or the IMU on-board the mobile robot 102. In some embodiments, $T_{b_k}^{c_k}$ can be pre-calibrated before operating the mobile robot 102 (e.g., upon installation of the monocular camera and the IMU on the mobile robot 102, for example, as shown in FIG. 1B). $T_{b_k}^{c_k}$ reveals the geometric relationship between IMU and the camera mathematically.

For calibration purposes, s, $R_v^w$ and $P_v^w$ are unknowns to be solved. Equation (2) as expanded is thus:

$$\begin{bmatrix} R_{b_k}^w & P_{b_k}^w \\ 0 & 1 \end{bmatrix} = \begin{bmatrix} R_v^w & P_v^w \\ 0 & 1 \end{bmatrix} \begin{bmatrix} R_{c_k}^v & sP_{c_k}^v \\ 0 & 1 \end{bmatrix} \begin{bmatrix} R_{b_k}^{c_k} & P_{b_k}^{c_k} \\ 0 & 1 \end{bmatrix} \quad (6)$$

Performing matrix multiplication and collecting the relevant terms:

$$R_{b_k}^w = R_v^w R_{c_k}^v R_{b_k}^{c_k} \quad (7)$$

$$P_{b_k}^w = R_v^w (R_{c_k}^v R_{b_k}^{c_k} + sP_{c_k}^v) + P_v^w \quad (8)$$

Solving for $R_v^w$ based on Equation (7), $$R_v^w = R_{b_k}^w R_{c_k}^{v-1} R_{b_k}^{c_k-1} \quad (9)$$

In Equation (9), the inverse of the rotational matrix $R_{b_k}^{c_k}$ (i.e., $R_{b_k}^{c_k-1}$) of the robot body frame referenced to the camera frame when $k_{th}$ image is taken, is multiplied to the inverse of the rotational matrix $R_{c_k}^c$ (i.e., $R_{c_k}^{v-1}$) of the camera frame referenced to the visual coordinate reference frame when $k_{th}$ image is taken, multiplied to the rotation matrix of the robot body frame referenced to the world coordinate reference frame when $k_{th}$ image is taken. A single set of paired data (the kth camera frame and the IO measurement associated with the kth camera frame in the paired poses) is used to determine $R_v^w$, in contrast, n sets of data is used for determining s and $P_v^w$. In some embodiments, n sets of data to solve $R_v^w$, using a different formulation. In some embodiments, the single set of paired data works as well as multiple set of data, and it may also be easier to implement.

After solving for $R_v^w$ using Equation (9), s and $P_v^w$ are solved by rearranging Equation (8) into the following Equation (10).

$$\begin{bmatrix} R_v^w P_{c_k}^v & I \end{bmatrix} \begin{bmatrix} s \\ P_v^w \end{bmatrix} = P_{b_k}^w - R_v^w R_{c_k}^v P_{b_k}^{c_k} \quad (10)$$

where I is identity (e.g., 1).

A corresponding series of equations from different observations based on different camera frames k to k+n (e.g., $P_{c_{k+1}}^v$ to $P_{c_{k+n}}^v$) and their respective associated IMU measurements (e.g., $P_{b_k}^w$ to $P_{c_{k+n}}^w$) is rearranged according to Equation (10). Further substituting the solved $R_v^w$ from equation (9) into equation (11) below:

$$\begin{bmatrix} [R_v^w P_{c_k}^v & I] \\ [R_v^w P_{c_{k+1}}^v & I] \\ \vdots \\ [R_v^w P_{c_{k+n}}^v & I] \end{bmatrix} \begin{bmatrix} s \\ P_v^w \end{bmatrix} = \begin{bmatrix} P_{b_k}^w - R_v^w R_{c_k}^v P_{b_k}^{c_k} \\ P_{b_{k+1}}^w - R_v^w R_{c_{k+1}}^v P_{b_{k+1}}^{c_k} \\ \vdots \\ P_{b_{k+n}}^w - R_v^w R_{c_{k+n}}^v P_{b_k}^{c_k} \end{bmatrix} \quad (11)$$

Equation (11) can be recast as a least square problem Ax=b where A=

$$\begin{bmatrix} [R_v^w P_{c_k}^v & I] \\ [R_v^w P_{c_{k+1}}^v & I] \\ \vdots \\ [R_v^w P_{c_{k+n}}^v & I] \end{bmatrix},$$

the unknowns to be solved are the elements of $$x = \begin{bmatrix} s \\ P_v^w \end{bmatrix},$$

and b=

$$\begin{bmatrix} P_{b_k}^w - R_v^w R_{c_k}^v P_{b_k}^{c_k} \\ P_{b_{k+1}}^w - R_v^w R_{c_{k+1}}^v P_{b_k}^{c_k} \\ \vdots \\ P_{b_{k+n}}^w - R_v^w R_{c_{k+n}}^v P_{b_k}^{c_k} \end{bmatrix}.$$

The translation vector $P_v^w$ and the scale s are (unknown) constant in frames k to k+n and can be solved using the least square formulation once a sufficient number of observations have been collected (e.g., observations k to k+n, where n meets a first threshold). In some embodiments, n is at least 10, or at least 20 (e.g., n is 20, n is more than 20, n is 30, n is 40). In equation (11), $R_v^w$ is a known which is solved in equation (9), and for each data point $R_v^w$ is the same. And $R_{b_k}^{c_k}$ and $P_{b_k}^{c_k}$ are both assumed time-invariant, since they are only determined by the IMU and camera's installation position.

The solved s is multiplied to the corresponding translation vector $P_{c_k}^c$ (the $k^{th}$ camera frame referenced to the visual coordinate reference frame) to yield $sP_{c_k}^v$, which results an initial estimation of the true scale of the positions. $P_{c_k}^v$ is the relative translation between $P_{c_0}^v$ and $P_{c_k}^v$ (e.g., not the relative translation between $P_{c_{k-1}}^v$ and $P_{c_k}^v$).

Scale Optimization

Scale calibration (e.g., s, solved via Equation (11)) provides an initial estimate of a visual odometry scale factor. In some embodiments, calibration errors due to measurement errors, wheel slippage, or other factors may lead to inaccuracy of visual-inertial odometry (e.g., odometry based on both data from IMU sensor(s) and image(s) captured from a camera). An iterative algorithm to optimize the scale factor (e.g., after it has been initially determined based on Equation (11) above) on-the-fly while the system is in operation (or "online scale optimization") is described below.

Figure 5A:
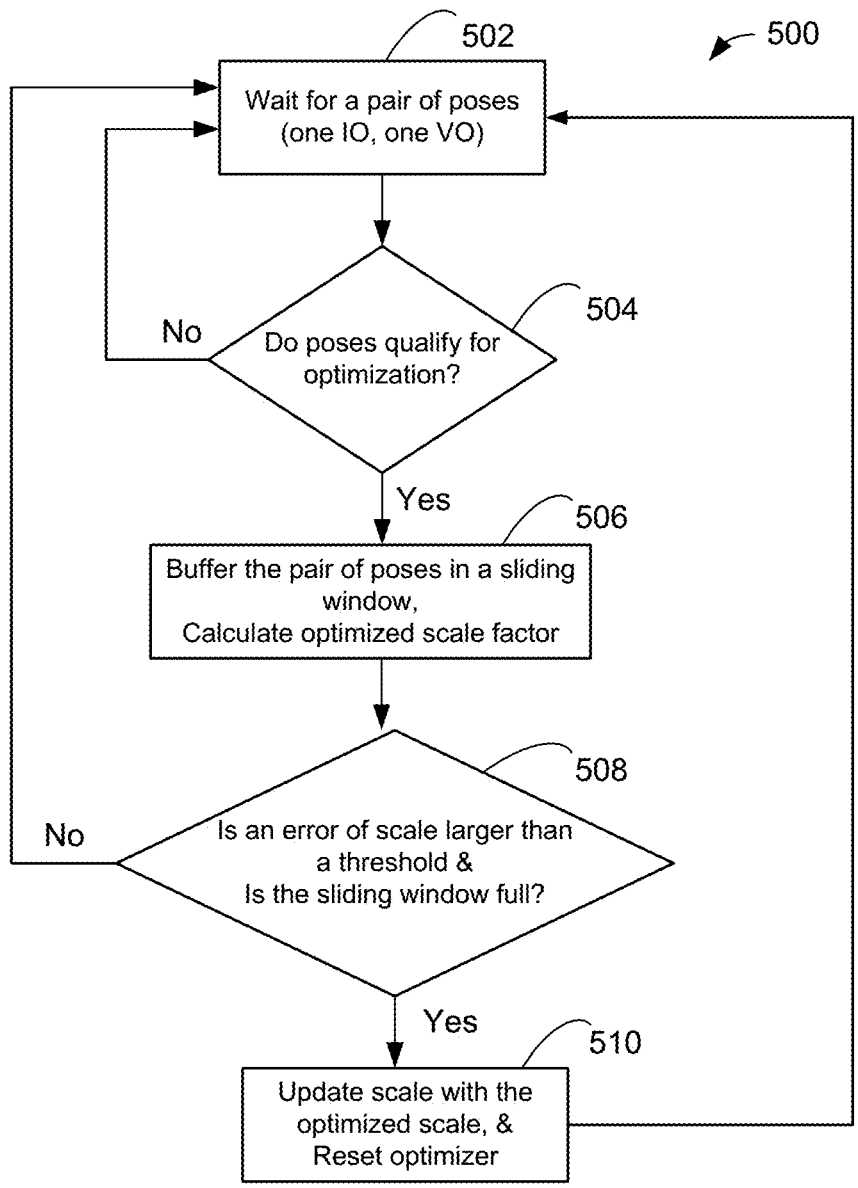
FIG. 5A is a flow diagram illustrating an example process of optimizing a scale factor in accordance with some embodiments.

FIG. 5A depicts an example process flow for optimizing a scale factor, in accordance with some embodiments. A process 500 for optimizing the scale factor may be initiated once an initial calculation of s, the scale factor, has been obtained using Equation (11). The process 500 is activated to monitor potential scale changes during operation of the mobile robot. Scale changes may occur when the mobile robot enters a new portion of the environment 100 (e.g., a room or a portion of a room with a different ceiling height, a region having a different background texture, or a region having some larger scale changes in the background).

The process 500 of scale optimization begins at a step 502 by waiting for the pair of poses. In some embodiments, the process 500 is executed at the component 268. After receiving the pair of poses (e.g., a VO pose without scale from the VO module 264, and an IO pose from the IO module 260), a determination is made at a step 504 if the received poses qualify for calibration. The poses received at the step 504 are additional poses received after the initial scale factor s has been determined (e.g., poses received after the (k+n)$^{th}$ image frame). In accordance with a determination that the received poses do not qualify for calibration, the process 500 returns to the step 502 to wait for a next pair of poses. Criteria for qualification includes, for example, relative angles or distance between consecutive poses. The angular measurements are from IMU, and the distance measurements are from wheel encoder. In some embodiments, the distance can be measured from IMU as well. In some embodiments, at least one pose is stored in a temporary buffer to make this qualification determination with respect to consecutive poses. In some embodiments, the qualification adopted in the scale optimization process accepts poses that have a minimum distance between each other, and the poses are rejected if the angle changes too much. Such a qualification criterion helps to collect poses that have more translation and less rotation. Ensuring that a minimum angular change exists between IO poses helps to ensure that the mobile robot 102 is not stuck in a substantially fixed position.

In accordance with a determination that the received poses qualify for scale optimization, the pair of poses are buffered at a step 506 in a sliding window. The sliding window has a predetermined length (e.g., has a length for storing twenty pairs of poses, if poses are received at 10 Hz, and every pair of received poses qualifies for optimization, the sliding window will be filled after 2 seconds of data collection). After the pair of poses are buffered at the step 506, the optimized scale factor is calculated, as described below.

In accordance with a determination at a step 508 that the optimized scale factor is larger than a threshold and the sliding window is full, the process 500 moves to a step 510 in which the scale factor is updated with the optimized scale that satisfied the determination made at the step 508, and the optimizer (e.g., storage associated with the sliding window is cleared, and other temporary buffers are cleared) is reset. If the discrepancy is smaller than the threshold, the current scale is not updated, and the sliding window continues to receive new incoming qualified poses and an optimized scale is calculated.

Figure 5B:
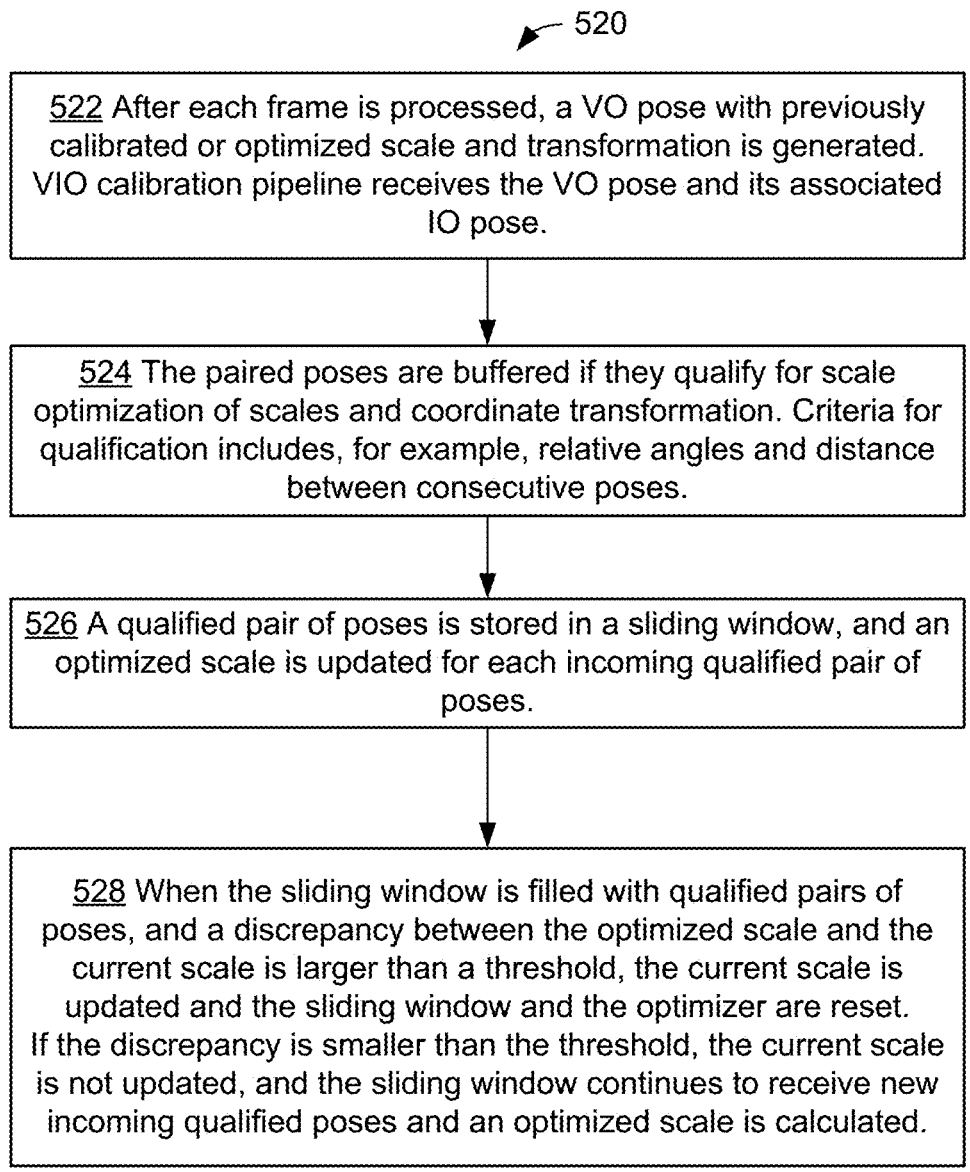
FIG. 5B depicts an example process flow for optimizing a scale factor, in accordance with some embodiments

FIG. 5B depicts an example process flow for optimizing a scale factor, in accordance with some embodiments. FIG. 5B shows a flow chart 520 of the steps associated with the process 500, in accordance with some embodiments. After each camera frame is processed (e.g., by the VO module 264), a VO pose with previously calibrated or optimized scale and transformation is generated. VIO calibration pipeline (e.g., the component 268) receives (522) the VO pose and its associated IO pose.

The paired poses are buffered (524) if they qualify for scale optimization and coordinate transformation. Criteria for qualification includes, for example, a minimum and/or a maximum relative angles and/or distance between IO poses. The pair of poses refers to one IO pose and its associated (e.g., one) VO pose. In some embodiments, when evaluated for qualification, only the IO poses are used since they are more stable. A relative angle between IO poses is measured with respect to a previous pose stored in the sliding window.

A qualified pair of poses is stored in a sliding window, and an optimized scale is updated (526) for each incoming qualified pair of poses. In some embodiments, buffering the paired of poses in the step 524 and storing the qualified poses in a sliding window are equivalent. When the sliding window is filled with qualified pairs of poses, and a discrepancy between the optimized scale and the current scale is larger than a threshold, the current scale (e.g., value of the scale factor derived from Equation (11)) is updated (528) and the sliding window and the optimizer are reset. If the discrepancy is smaller than the threshold, the current scale is not updated, and the sliding window continues to receive new incoming qualified poses and an optimized scale is calculated.

The scale optimization compensates for residual error in the scale estimation that remains uncorrected after the scale calibration. For example, $P_{vo_k}^{k-1}$ is the relative translation vector calculated by visual-odometry between two sampling instances (e.g., k−1 and k). The relative translation vector is independent of the original reference coordinate frame of the measurement. Using a relative pose between frames helps to avoid the influence of the original reference coordinate frame. and $P_{io_k}^{k-1}$ is the relative translation vector calculated using inertial-odometry measurements between the two same (or neighbor) sampling instances.

Residual scale η for compensating the residual errors r(η) between two groups of measurements is:

$$r(\eta) = \Sigma_{k=1}^{K} \|\eta P_{vo_k}^{k-1} - P_{io_k}^{k-1}\|^2 \quad (12)$$

Equation (12) shows that the residual errors r(η) is a function of the residual scale η, and is the squared sum of the absolute difference between corresponding pairs $\eta P_{vo_k}^{k-1}$ and $P_{io_k}^{k-1}$ for k running from 1 to K.

To minimize the function of the residual error r(η), the value of η is to be optimized so that $$\arg \min_{\eta} r(\eta).$$

Mathematically, the minimum value of the function r(η) occurs when the first derivative of Equation (12) is zero.

The first derivative of Equation (12) with respect to η is:

$$\frac{dr}{d\eta} = \sum_{k=1}^{K} [2(\eta P_{vo_k^{k-1}} - P_{io_k^{k-1}}) P_{vo_k^{k-1}}] \quad (13)$$

Setting the Equation (13) to zero, and removing the factor of 2:

$$\Sigma_{k=1}^{K}[(\eta_{opt} P_{vo_k}^{k-1} P_{vo_k}^{k-1} - P_{io_k}^{k-1} P_{vo_k}^{k-1}] = 0 \quad (14)$$

Rearranging Equation (14), the optimized residual scale $\eta_{opt}$ is expressed as:

$$\eta_{opt} = \frac{\sum_{k=1}^{K} P_{io_k}^{k-1} P_{vo_k}^{k-1}}{\sum_{k=1}^{K} P_{ov_k}^{k-1} P_{vo_k}^{k-1}} \quad (15)$$

where $\eta_{opt}$ is the optimal value to minimize r(η).

The scale factor $s_{i-1}$ is updated to $s_i$ using the following equation:

$$s_i = \alpha(\eta_{opt} - 1)s_{i-1} + s_{i-1} \quad (16)$$

$s_i$ is the scale after $i^{th}$ (e.g., the most current) iteration, $s_{i-1}$ is the scale prior to the update, and α is the learning rate that controls how much the optimized residual scale $\eta_{opt}$ modifies $s_{i-1}$. In some embodiments, α is a heuristic. For example, the value of α depends on various factors, such as the signal-to-noise ratio, sampling rate of the sensor and how fast the scale is to settle on the optimized value. In some embodiments, α is a very small number, tied to specifics of the application and some tuning (e.g., less than 0.5, less than 0.1, less than 0.01, less than 0.001). In some embodiments, a signal to noise ratio (SNR) of the mobile robot 102 is used to set the learning rate.

In some embodiments, an optimized scale $s_i$ is computed for every new pair of poses received at the step 522 (or the step 506), but the scale factor s, first determined by Equation 11, is only updated when a discrepancy between the optimized scale and the current scale ($s_i - s_{i-1}$) is larger than a threshold, and the sliding window that is storing the additional pairs of poses received at the step 506 is full. In some embodiments, the scale optimization process terminates upon a determination that abs(η−1) is smaller than a threshold.

Wheel Slip Detection

Wheel slippage (e.g., a wheel on the mobile robot is turning, but the mobile robot is not substantially changing its position in the environment 100) can occur when the mobile robot traverses between different terrains, such as carpet, wooden or tile floor, or crossing uneven surfaces, etc. Wheel slippage can also be referred to as "slip events". The slip events can introduce errors in displacement measurements (e.g., by the wheel encoder 258), and slip events occur only for the wheels. Wheel slippage mainly affects the odometry measurements made by the wheel encoder. As the scale calibration relies on reliable odometry measurement from the wheel encoder, once wheel slippage is detected, the associated measurements are invalidated and measurements are repeated (e.g., redone) for the scale calibration. during the robot's traversal of the terrain, resulting in inaccurate scale calibration and/or optimization and reduce localization accuracy in the long run. A wheel slippage detection method described below helps to mitigate such degradation in the accuracy of the localization process. The wheel slippage detection method utilizes multimodal sensory inputs to detect if one or more robot wheels are in slipped state, and effectively remove or suppress, in the pose fusion process, the measurements captured while the robot wheel(s) is in the slipped state. The results from the wheel slippage detection also notify a planner for further corrective actions. The planner is a module used to plan the routes and motion for robot.

Figure 6:
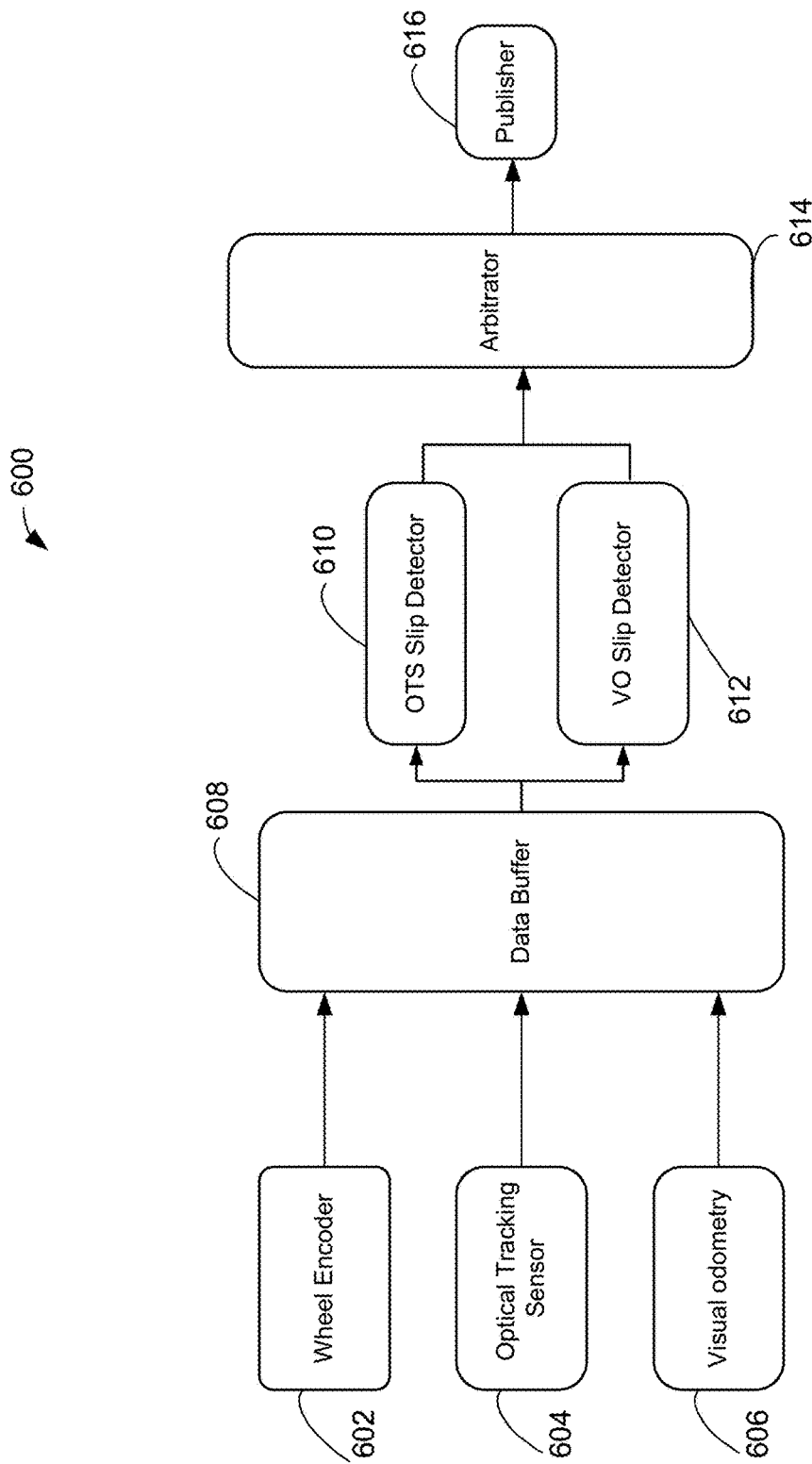
FIG. 6 depicts a schematic diagram of a system that includes a wheel slip detection module, in accordance with some embodiments.

FIG. 6 depicts a schematic diagram of a system that includes a wheel slip detection module, in accordance with some embodiments. A system 600 includes a number of modules for sensory data collection: a wheel encoder 602, an optical tracking sensor 604 (e.g., similar to OTS sensor 252), and a visual odometry module 606 (e.g., similar to camera 262 and the visual odometry module 264. The system 600 also includes a data buffer 608 for storing multimodal sensory data (e.g., for storing the multimodal sensory data over a specific time window, such as a sliding window). The system 600 includes an OTS based slip detector 610 and a VO based slip detector 612. The system 600 includes an arbitrator 614 that determines the final detection results relating to the wheel slippage, and a publisher 616 that sends wheel slip events to the planner module.

Figure 7A:
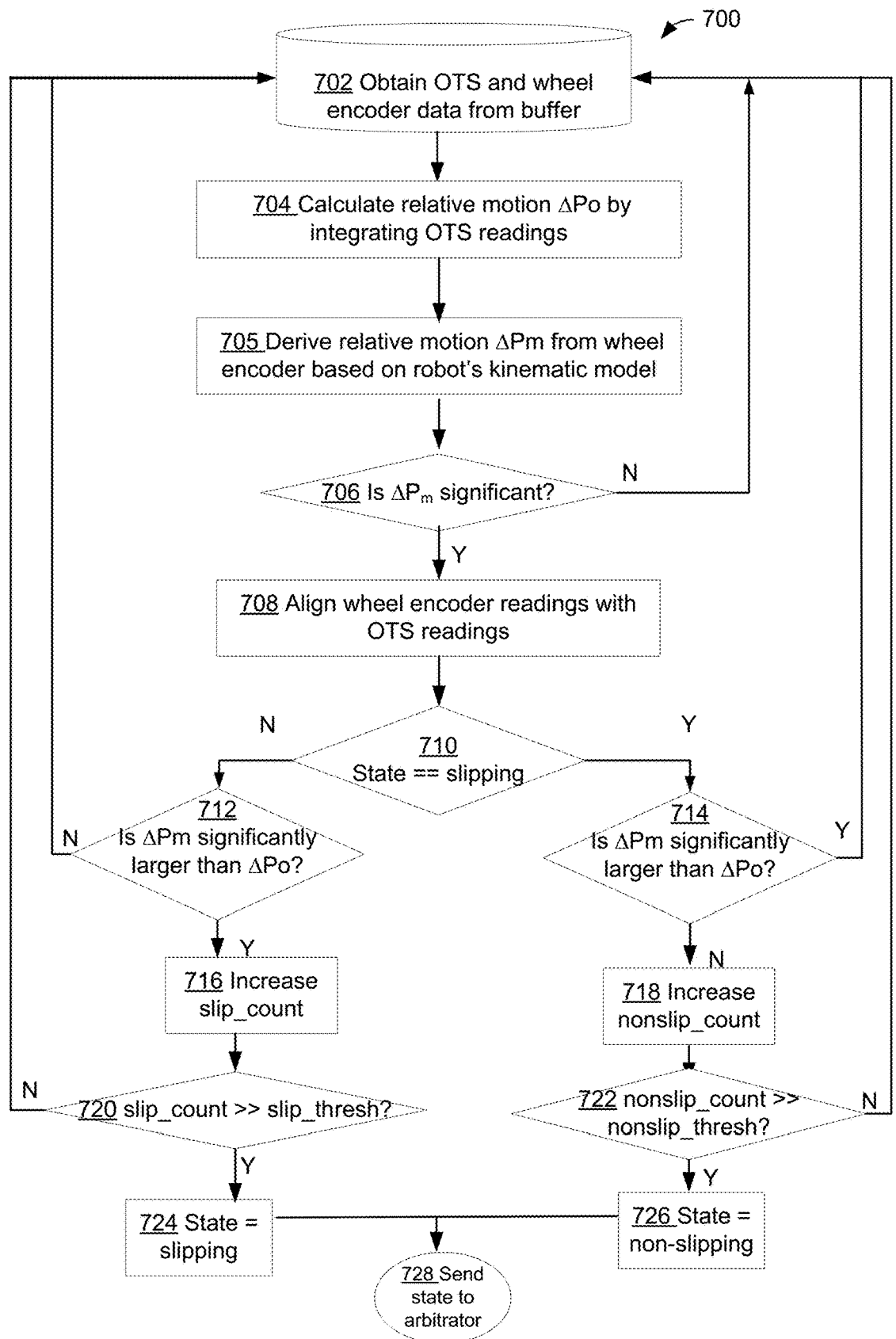
FIG. 7A is a flow diagram illustrating an example process of detecting wheel slippage using an optical tracking sensor module in accordance with some embodiments.

FIG. 7A is a flow diagram illustrating an example process of detecting wheel slippage using an optical tracking sensor module in accordance with some embodiments. A process 700 for detecting wheel slippage begins at a step 702 by obtaining OTS and wheel encoder data from a buffer (e.g., data buffer 608). In some embodiments, the process 700 is executed as a part of the step 214. At a step 704, a relative motion $\Delta P_o$ is calculated by integrating OTS readings. Integration the OTS reading over a time period t to t+αt yields a relative motion measurement $\Delta P_o$ from t to t+αt. In some embodiments, using the OTS sensor to measure the robot motion from t to t+αt, can provide an important reference (e.g., that is used to compare with wheel encoder odometry measurements) for checking for wheel slip events, especially when the relative motion measurement $\Delta P_o$ is significant. At a step 705, the process 700 derives a relative motion $\Delta P_m$ from the wheel encoder based on the mobile robot's kinematic model. In accordance with a determination at a step 706 that $\Delta P_m$ from the wheel encoder is significant (e.g., larger than a first threshold), the process 700 moves to a step 708, where the wheel encoder reading is aligned with the OTS data. For example, $\Delta P_m$ continues to increase even when the robot is stuck. In some embodiments, the first threshold beyond which $\Delta P_o$ is considered significant is about 0.1 m (e.g., greater than 0.05 m, greater than 0.2 m, greater than 0.3 m) The first threshold is a tuning parameter used to reduce false positive detection due to sensor noise. When the $\Delta P_m$ is not considered significant at the step 706, the process 700 returns to the step 702 to continue obtaining OTS data and wheel encoder data from the buffer. In some embodiments, the wheel slippage detection according to the process 700 is carried out only after the OTS readings confirm that the mobile robot has moved through a threshold distance. Wheel slippage detection helps to prevent errors (e.g., wrong scale calibration) in scale calibration. When the robot relative's motion is insignificant, the scale calibration process also does not begin, (e.g.

scale calibration is not performed when the mobile robot is in the fully slipped state. Hence, OTS-based slip detection can still provide protection for ongoing scale calibration. After $\Delta P_m$ from wheel encoder is checked at the step 706, the process 700 checks against $\Delta P_o$ at the step 708 to detect a wheel slippage event.

Aligning the wheel encoder readings with OTS readings includes matching up the readings of the wheel encoders to check if the wheel encoder(s) also measures a commensurate amount of movement as determined by the OTS readings. The alignment process is used mainly to align the time periods of sensor recordings of both the OTS and wheel encoder. In accordance with a determination at a step 710 that a previous state of the mobile robot is not a slipping state (e.g., before any slippage has been detected, the previous state of the mobile robot is set to a non-slipping state), the process 700 checks at a step 712 if $\Delta P_m$ is significantly greater than $\Delta P_o$ In some embodiments, $\Delta P_m$ is significantly greater than $\Delta P_o$ when a threshold range of the ratio $\Delta P_o/\Delta P_m$ is between 0.001 to 0.1. In some embodiments, a ratio of $\Delta P_o/\Delta P_m$ is less than 0.01, and the mobile robot is considered to be experiencing a significant wheel slippery event. In some embodiments, the first threshold is proportional to the second threshold (e.g., the first threshold is equal to the second threshold, the first threshold is a multiple of the second threshold, the second threshold is a multiple of the first threshold).

In accordance with a determination that $\Delta P_m$ is not significant greater than $\Delta P_o$ (e.g., greater than $\Delta P_o$ by the second threshold), the process 700 returns to the step 702 to continue obtaining OTS data and wheel encoder data from the buffer. In accordance with a determination that $\Delta P_m$ is greater than $\Delta P_o$ by the second threshold, a counter for number of slips is increased by one at a step 716. In accordance with a determination at a step 720 that the counter for the number of slips is not greater than a value of a slip count threshold, the process 700 returns to the step 702 to continue obtaining OTS data and wheel encoder data from the buffer. In accordance with a determination at the step 720 that the counter for the number of slips is greater than the value of the slip count threshold, the process 700 sets, at a step 724, a current state of the mobile robot to be a slipping state, and at a step 728, the state (e.g., slipping) is sent to the arbitrator (e.g., the arbitrator 614). In some embodiments, the use of the counter for the number of slips increases the accuracy of the wheel slippage detection by discount "one off" measurements (e.g., caused by noise, or brief malfunction) of $\Delta P_m$ being significantly greater than $\Delta P_o$. The state of the mobile robot is only set to the slipping state when several repeated measurements (e.g., at least 2, at least 5, at least 10) shows that $\Delta P_m$ is significantly greater than $\Delta P_o$.

In accordance with a determination at the step 710 that the previous state of the mobile robot is a slipping state, the process 700 checks at a step 714 if $\Delta P_m$ is significantly greater than $\Delta P_o$. In the step 714, if $\Delta P_o/\Delta P_m > 0.9$ or higher, then the wheel slippage is determined to not be severe. In some embodiments, $\Delta P_m$ is significantly greater than $\Delta P_o$ when $\Delta P_m$ is greater than $\Delta P_o$ by more than a second threshold. In some embodiments, the second threshold is at least 0.2 m (e.g., second threshold is 0.3 m, second threshold is 0.4 m). In some embodiments, the first threshold is proportional to the second threshold (e.g., the first threshold is equal to the second threshold, the first threshold is a multiple of the second threshold, the second threshold is a multiple of the first threshold).

In accordance with a determination that $\Delta P_m$ is not significant greater than $\Delta P_o$ (e.g., $\Delta P_m$ is not greater than $\Delta P_o$ by the second threshold), the process 700 increases, at a step 718, a counter that indicates a number of non-slips (by one). In accordance with a determination at a step 722 that the counter for the number of non-slips is not greater than a value of a non-slip count threshold, the process 700 returns to the step 702 to continue obtaining OTS data and wheel encoder data from the buffer. In some embodiments, the use of the counter for the number of non-slips increases the accuracy of the wheel slippage detection by reducing the chance of erroneous changing from the "slipping" state to the "non-slipping" state due to "one off" measurements (e.g., caused by noise, or brief malfunction) of $\Delta P_m$ not being significantly greater than $\Delta P_o$. The state of the mobile robot is only set to the non-slipping state when several repeated measurements (e.g., at least 2, at least 5, at least 10) shows that $\Delta P_m$ is consistently not significantly greater than $\Delta P_o$.

In accordance with a determination at the step 720 that the counter for the number of non-slips is greater than a value of a non-slip count threshold, the process 700 sets, at a step 726, a current state of the mobile robot from a slipping state to a non-slipping state, and at a step 728, the state (e.g., non-slipping) is sent to the arbitrator (e.g., the arbitrator 614).

In accordance with a determination that $\Delta P_m$ is greater than $\Delta P_o$ by the second threshold, the process 700 returns to the step 702 to continue obtaining OTS data and wheel encoder data from the buffer.

Figure 7B:
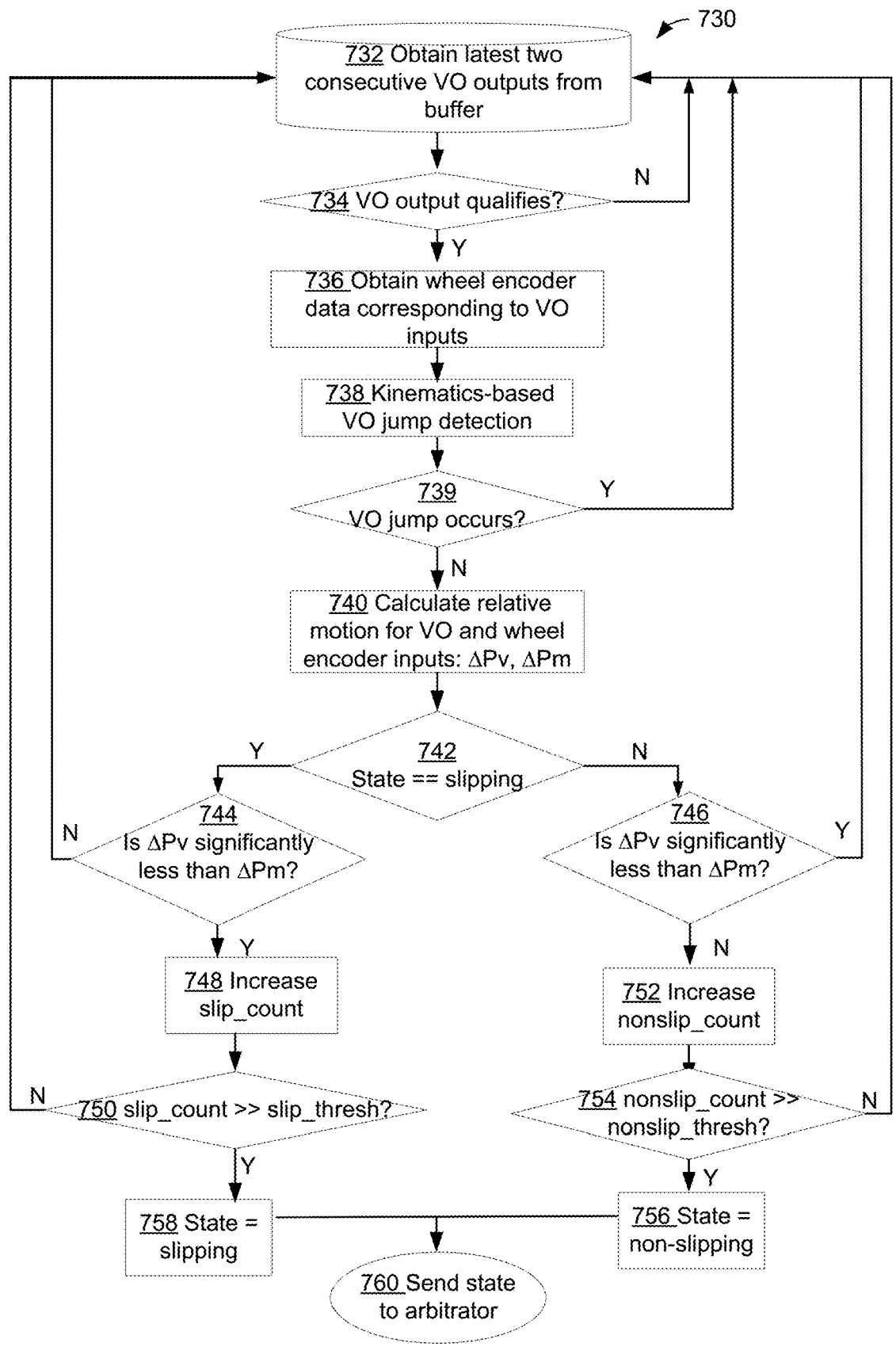
FIG. 7B is a flow diagram illustrating an example process of detecting wheel slippage using a visual odometry module in accordance with some embodiments.

FIG. 7B is a flow diagram illustrating an example process of detecting wheel slippage using a visual odometry(VO) module in accordance with some embodiments. In VO-based slip detection methods, such as a process 730 illustrated in FIG. 7B, the detection accuracy improves when VO measurements are qualified before being used for slip detection input. VO measurements may be invalid occasionally, and invalid VO measurements contain measurements that deviated from a valid measurement, such VO pose outliers may lead to wrong slip detection results and eventually affect system performance. In addition, for the pose fusion process (e.g., the step 222 in FIG. 2A), VO pose outliers should also be excluded to ensure global consistency of the fused pose.

Figure 7C:
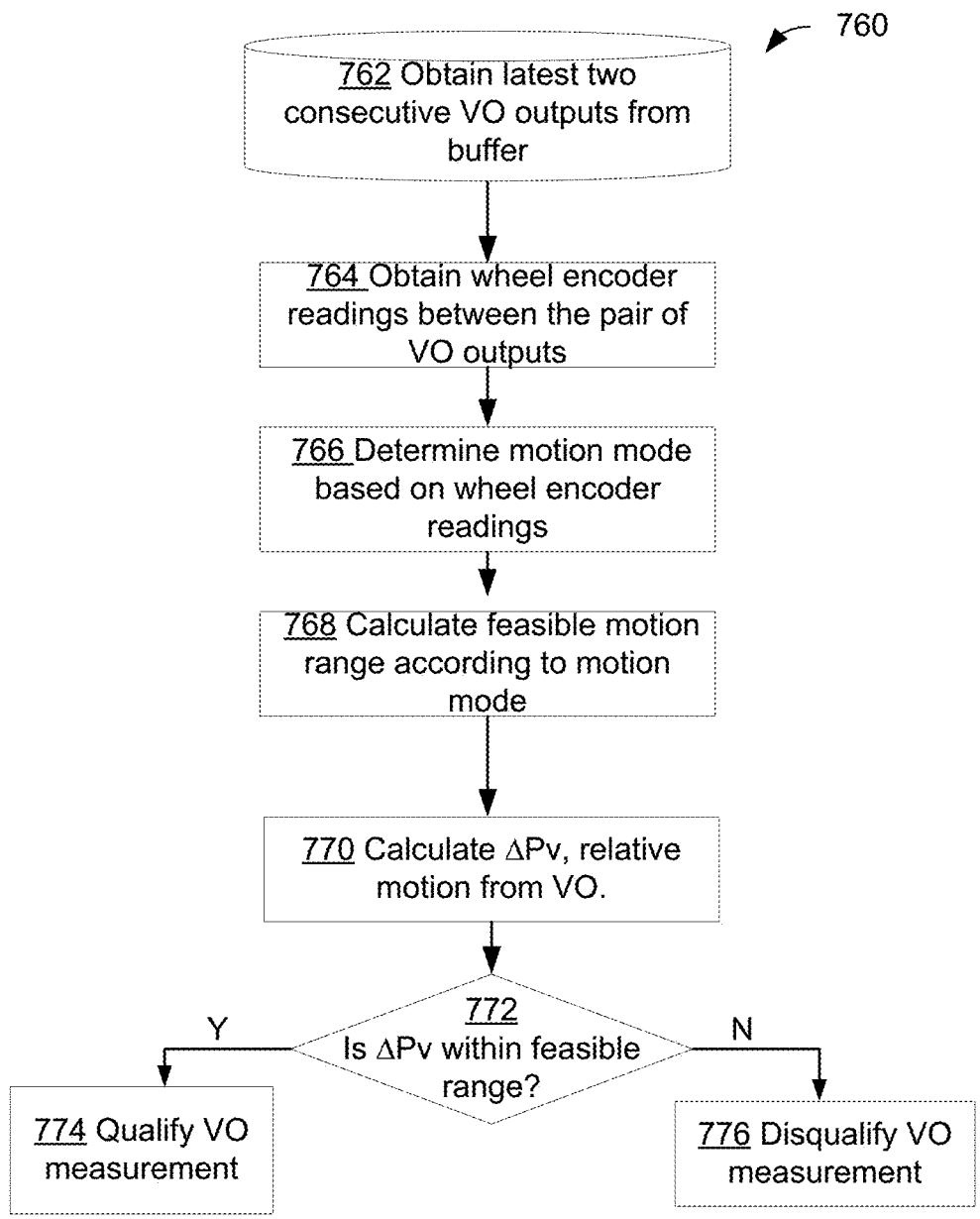
FIG. 7C depicts an example VO outlier detection method, in accordance with some embodiments.

A process 730 for detecting wheel slippage begins at a step 732 by obtaining the latest two consecutive VO outputs (e.g., two image frames) from a buffer (e.g., data buffer 608). In some embodiments, the process 730 is executed as a part of the step 214. At a step 734, a determination is made whether the VO output just retrieved qualifies for wheel slippage detection. In some embodiments, statistical tools such as RANSAC are used to determine if the VO outputs contain outliers. FIG. 7C depicts an example VO outlier detection method, in accordance with some embodiments.

A first step 762 in a process 760 for detecting a VO outlier includes obtaining the latest two consecutive VO outputs from the buffer. In some embodiments, the step 762 is simply the step 732. If the process 760 is called from the step 734 (of the process 730), the step 762 is already completed by the step 732 (e.g., no additional VO outputs are retrieved from the buffer, the two latest consecutive VO outputs obtained during the step 732 are used in the step 762).

At a step 764, the wheel encoder readings corresponding to the pair of retrieved VO outputs are obtained. Based on the obtained wheel encoder readings from the step 764, the process 760 determines, at a step 766, a motion mode of the mobile robot based on the wheel encoder readings. Further details about the motion mode detection is provided in the description of FIG. 8.

At a step 768, a feasible motion range is calculated based on the motion mode determined at the step 766. It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. Based on the two latest consecutive VO outputs retrieved at the step 762, a relative motion $\Delta P_v$ (e.g., a distance moved by the mobile robot between the two VO image frames) from the VO outputs is determined at a step 770. In some embodiments, the step 770 is carried out in parallel to the steps 764 to 768.

At a step 772 of the process 760, a determination is made whether $\Delta P_v$ is within the feasible range (e.g., calculated at the step 768). The two consecutive VO outputs obtained at the step 762 qualify as valid VO outputs (for further use in the process 730) at a step 774 when $\Delta P_v$ is within the feasible range calculated in the step 768. The two consecutive VO outputs obtained at the step 762 are disqualified as invalid VO outputs (and discarded or excluded from further use in the process 730) at a step 776 when $\Delta P_v$ is outside the feasible range calculated in the step 768.

Returning to FIG. 7B, after the VO output have been qualified at the step 734 (e.g., after completing the step 762), the process 730 proceeds to a step 736 during which wheel encoder data corresponding to the VO outputs (obtained from the step 732) are retrieved. In some embodiments, where the step 734 includes completing the process 760, the information obtained at the step 736 is already retrieved at the step 766 (of the process 760). At a step 738, the process 730 begins a kinematics-based VO jump detection. The kinematics-based VO jump detection is similar to the steps outlined in steps 766 and 768 of the process 760. In a step 739, the process 730 decides if a VO jump has occurred. A VO jump occurs when the VO outputs retrieved from the step 732 correspond to a larger change in displacement than calculated by the wheel encoder readings. The wheel encoder readings are interpreted under the assumption that no wheel slippage has occurred (e.g., assuming that all the wheel rotations recorded by the wheel encoder correspond to displacement of the mobile robot), and if the VO outputs shows a significantly larger movement than that provided by the wheel encoder reading, the process 730 determines that a VO jump has occurred. In some embodiments, the step 734 may be executed using only RANSAC (e.g., the process 760 is not carried out at the step 734), and the steps 736, 738, 739 are executed to determine if a VO jump has occurred. In some embodiments, the step 734 is executed using the process 760. In such embodiments, once the process 760 has determined that the two latest consecutive VO poses qualify for the wheel slippage detection, the process 730 can proceed directly to a step 740.

In accordance with a determination at the step 739 that a VO jump has occurred, the process 730 returns to the step 732 to retrieve a new pair of VO outputs. The previous pair of VO outputs corresponding to the VO jump is discarded or otherwise excluded from wheel slippage detection.

At the step 740, relative motion of the mobile robot as determined by the VO outputs ($\Delta P_v$) and by the wheel encoder ($\Delta P_m$) are determined. In some embodiments, $\Delta P_v$ is determined as a part of the step 738, or the step 770, and saved in a local memory such that only $\Delta P_m$ is calculated in the step 740.

In accordance with a determination at a step 742 that a previous state of the mobile robot is not a slipping state (e.g., before any slippage has been detected, the previous state of the mobile robot is set to a non-slipping state), the process 730 checks at a step 744 if $\Delta P_v$ is significantly less than $\Delta P_m$. In some embodiments, $\Delta P_v$ is significantly less than $\Delta P_m$ when $\Delta P_v$ is less than $\Delta P_m$ by more than a third threshold. In some embodiments, $\Delta P_v$ is significantly less than $\Delta P_m$ when a threshold range of the ratio $\Delta P_v/\Delta P_m$ is between 0.001 to 0.1. In some embodiments, a ratio of $\Delta P_v/\Delta P_m$ is less than 0.01, and the mobile robot is considered to be experiencing a significant wheel slippery event. In some embodiments, the third threshold is set to 0.15 m.

In accordance with a determination that $\Delta P_v$ is not less than $\Delta P_m$ by the third threshold, the process 730 returns to the step 732 to continue obtaining a new pair of consecutive outputs from the buffer. In accordance with a determination that $\Delta P_v$ is greater than $\Delta P_m$ by the third threshold, a counter for a number of slips is increased by one at a step 748. In accordance with a determination at a step 750 that the counter for the number of slips is not greater than a value of a slip count threshold, the process 730 returns to the step 732 to continue obtaining a new pair of consecutive outputs from the buffer. In accordance with a determination at the step 520 that the counter for the number of slips is greater than the value of the slip count threshold, the process 730 sets, at a step 758, a current state of the mobile robot to be a slipping state, and at a step 760, the state (e.g., slipping) is sent to the arbitrator (e.g., the arbitrator 614). In some embodiments, the value of the slip count threshold is the same in both the process 730 and the process 700. In some embodiments, the value of the slip count threshold is different between the processes 730 and 700 to account for differences between the sensory modules used in those processes (e.g., in the expected noise from the different measurements).

In some embodiments, the use of the counter for the number of slips increases the accuracy of the wheel slippage detection by discount "one off" measurements (e.g., caused by noise, or brief malfunction) of $\Delta P_v$ being significantly less than $\Delta P_m$. The state of the mobile robot is only set to the slipping state when several repeated measurements (e.g., at least 2, at least 5, at least 10) shows that $\Delta P_v$ is significantly less than $\Delta P_m$.

In accordance with a determination at the step 742 that the previous state of the mobile robot is a slipping state, the process 730 checks at a step 746 if $\Delta P_v$ is significantly less than $\Delta P_m$. In some embodiments, $\Delta P_v$ is significantly less than $\Delta P_m$ when $\Delta P_m$ is greater than $\Delta P_o$ by more than the third threshold.

In accordance with a determination that $\Delta P_v$ is not less than $\Delta P_v$ by the third threshold, the process 730 increases, at a step 752, a counter that indicates a number of non-slips (by one). In accordance with a determination at a step 754 that the counter for the number of non-slips is not greater than a value of a non-slip count threshold, the process 730 returns to the step 732 to continue obtaining a new (e.g. latest) pair of VO outputs from the buffer. In some embodiments, the use of the counter for the number of non-slips increases the accuracy of the wheel slippage detection by reducing the chance of erroneous changing from the "slipping" state to the "non-slipping" state due to "one off" measurements (e.g., caused by noise, or brief malfunction) of $\Delta P_v$ not being significantly less than $\Delta P_w$. The state of the mobile robot is only set to the non-slipping state when several repeated measurements (e.g., at least 2, at least 5, at least 10) shows that $\Delta P_v$ is consistently not significantly less than $\Delta P_m$.

In accordance with a determination at the step 754 that the counter for the number of non-slips is greater than a value of a non-slip count threshold, the process 730 sets (e.g., changes), at a step 756, a current state of the mobile robot from a slipping state to a non-slipping state, and at the step 760, the state (e.g., non-slipping) is sent to the arbitrator (e.g., the arbitrator 614).

In accordance with a determination that $\Delta P_v$ is less than $\Delta P_m$ by the third threshold, the process 730 returns to the step 732 to continue obtaining a new (e.g. latest) pair of VO outputs from the buffer.

Figure 8B:
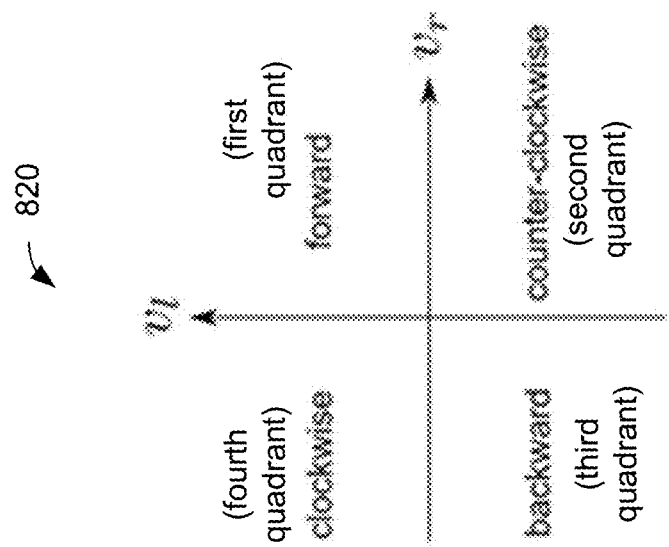
FIG. 8B depicts different motion modes of the mobile robot, in accordance with some embodiments.
Figure 8A:
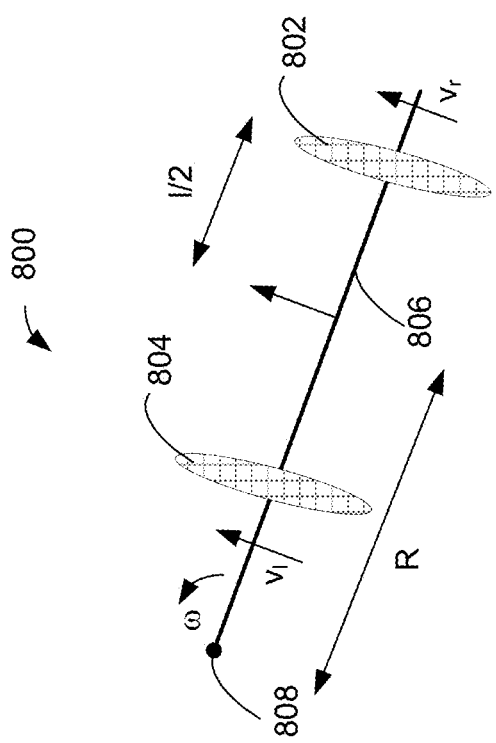
FIG. 8A depicts an example differential drive robot, in accordance to some embodiments.

FIG. 8A depicts an example differential drive robot, in accordance to some embodiments. A robot 800 includes a right wheel 802 and a left wheel 804 mounted on a common axis 806 having a length 1. The right wheel 802 is driven by a motor to have a linear velocity $v_r$, and the left wheel 804 is driven by a motor to have a linear velocity $v_l$. A differential drive robot controls its pose by providing independent velocity control to its left wheel 802 and its right wheel 804. R is a signed distance from an instantaneous center of curvature (ICC) 808 to a midpoint between the left wheel 804 and the right wheel 802.

FIG. 8B depicts different motion modes of the mobile robot, in accordance with some embodiments. A diagram 820 in FIG. 8B shows four different types of motion modes: forward, clockwise, counter-clockwise and backward, depending on the velocity $v_r$ of the right wheel, and the velocity $v_l$ of the left wheel. When both $v_r$ and $v_l$ are positive, the motion mode of the mobile robot is forward (in the first quadrant). When both $v_r$ and $v_l$ are negative, the motion mode of the mobile robot is backward (in the third quadrant). When $v_r$ is positive and $v_l$ is negative, the motion mode of the mobile robot is counter-clockwise (in the second quadrant). When $v_r$ is negative and $v_l$ is positive, the motion mode of the mobile robot is clockwise (in the fourth quadrant).

In some embodiments, the mobile robot moves in a manner that mixes (e.g., different) motion modes within a single detection period. In such embodiments, the system uses a more relaxed estimation of feasible motion region.

Equations (13) and (14) describe the feasible regions of motion in the first and the third quadrants.

$$r = \begin{cases} (|v_l^{max}| + |v_r^{max}|) * \frac{T}{2} & (1st \text{ quadrant}) \\ (|v_l^{min}| + |v_r^{min}|) * \frac{T}{2} & (3rd \text{ quadrant}) \end{cases} \quad (13)$$

$$\theta = \begin{cases} \left[-v_l^{max} * \frac{T}{2l}, v_r^{max} * \frac{T}{2l}\right] & (1st \text{ quadrant}) \\ \left[\pi + v_r^{min} * \frac{T}{2l}, \pi - v_l^{min} * \frac{T}{2l}\right] & (3rd \text{ quadrant}) \end{cases} \quad (14)$$

T is the time interval between the pair of the VO outputs. l is the length of the axis joining the left wheel and the right wheel, r is the radius of the (maximum) trajectory covered by the mobile robot during the time T. $\theta$ is angle turned through by the mobile robot during the time T. the $v_l^{max}$ is the maximum linear velocity detected by the wheel encoder for the left wheel 804. $v_r^{max}$ is the maximum linear velocity detected by the wheel encoder for the right wheel 802. $v_l^{min}$ is the minimum linear velocity detected by the wheel encoder for the left wheel 804. $v_r^{min}$ is the minimum linear velocity detected by the wheel encoder for the right wheel 802. When $v_r^{min}$ and/or $v_l^{min}$ is negative, the minimum linear velocity corresponds to the highest negative value in the linear velocity.

Based on the Equations (13) and (14), the feasible region for motion in the first and the third quadrants is a sector-shaped region (e.g., the angle of the sector is defined by θ) having a radius determined by r.

Equations (15) and (16) describe the feasible regions of motion in the second and the fourth quadrants.

$$r = \begin{cases} \max(v_l^{max}, -v_r^{min}) * T(2nd \text{ quadrant}) \\ \max(-v_l^{min}, -v_r^{max}) * T(4th \text{ quadrant}) \end{cases} \quad (15)$$

$$\theta \Sigma [0, 2\pi] \quad (16)$$

The selection of the maximum value between $v_l^{max}$, $-v_r^{min}$ and between $-v_l^{min}$, $v_r^{max}$ is used to estimate the farthest distance the robot can go in the second and fourth quadrant.

The feasible region for motion of the mobile robot in the second and the fourth quadrants is 2D ball shape. Equation (16) shows that, in some embodiments, the mobile robot can rotate through a ball-shaped (circular region, anywhere within a 360° range) if the velocity of the mobile robot is sufficiently large.

Equations (13)-(16) estimate a motion between two wheel encoder readings, or a "one-step" relative motion between two readings. In some embodiments, the wheel encoder readings are recorded at a higher frequency than the camera sampling rate that generates VO readings. For example, the wheel encoder may have a frequency of 50 Hz, and the camera sampling rate is 10 Hz. In such a case, the relative motion for 50/10=5 small steps is to be considered in the calculation. In an ideal (non-slip case), 5 steps of wheel encoder readings is integrated to yield the relative motion. However, for cases that include wheel slippage, "possible" small motion ranges are integrated, leading to a bigger range in order for wheel encoder data to be comparable with VO data. Equation (16) provides a very rough estimation. Though a narrower angular range may be calculated, such "range" integration calculation may be complex due to irregular shape of the trajectory Further considering that the wheel speed may be different for each step, the accumulated shape is complicated and computational heavy to track. The estimation provided in Equation (16) provides a faster and simpler solution When there are mixed motion modes during a single detection period (e.g., within the time T, the mobile robot transitions from the first quadrant to the second quadrant), Equation (16) and Equation (17) describe feasible motion for such mixed motion modes:

$$r = (\max(|v_l|) + \max(|v_r|)) * \frac{T}{2} \quad (17)$$

For mixed motion modes, the feasible region for mixed motion estimation is more conservative 2D-ball shape. In some embodiments, more conservative means that the theoretical range of motion should be smaller than the calculated ball (e.g., circular shape) governed by r from Equation (17), which provides an envelope containing all possible motion outcomes (mixed and single motions, with/without wheel-slippage). Equation (17) may be considered a superset of Equations (13)-(16). Equations (13)-(16) provide a better estimation than Equation (17) when one or more conditions is met (e.g., within time window T, the robot performs single mode motion). Equation (17) handles remaining cases not covered by Equations (13)-(16). Equation (17) yields a bigger radius range than the calculated radius range from Equation (15) (e.g., comparing to the second and fourth quadrants). And the angular range associated with mixed motion mode is larger than the angular range calculated from Equation (14) (e.g., comparing to the first and third quadrants). In some embodiments, the larger radius and angular ranges are tradeoffs for simplifying the range estimation of complicated mixed motion modes case.

Extended Kalman Filter of VO and IO Pose Fusion Process

At the step 222 (in FIG. 2A), the system 200 carries out asynchronous pose fusion. In some embodiments, the asynchronous pose fusion is carried out using an extended Kalman filter (EKF). In some embodiments, the process model includes data recorded by the inertial odometry module and OTS module. The process model can be expressed as:

$$x_k = f(x_{k-1}, u_k) + w_k \quad (18)$$

$$x_k = \begin{bmatrix} P_{x,k} \\ P_{y,k} \\ \theta_{x,k} \end{bmatrix} = \begin{bmatrix} P_{x,k-1} + u_{r,k}\cos(\theta_{x,k-1} + u_{\theta,k}) \\ P_{y,k-1} + u_{r,k}\sin(\theta_{x,k-1} + u_{\theta,k}) \\ \theta_{x,k-1} + u_{\theta,k} \end{bmatrix} \quad (19)$$

$$= f(x_{k-1}, u_k) + w_k \quad (20)$$

$x_k$ is the pose of the mobile robot in 2D, it is a vector that has three component: $P_{x,k}$ and $P_{y,k}$ represent the x and y coordinate (position) of the robot, respectively and $\theta_{x,k}$ represents an orientation (e.g., heading angle) of the robot. Unlike the earlier section in which the pose are all computed and processed in 3D space, in this section (Extended Kalman filter of VO and IO pose fusion process), the pose is calculated only for 2D space, which is a sufficient approximation for robot applications on a flat ground, simplifying the computation by taking only some components in the 3D pose and applying the EKF only in 2D.

In some embodiments, the measurement model includes data recorded by the visual odometry module and includes with scale correction. The measurement model can be expressed as:

$$y_k = h(x_k) + v_k = \begin{bmatrix} 1 & 0 & 0 \\ 0 & 1 & 0 \\ 0 & 0 & 1 \end{bmatrix} \begin{bmatrix} P_{x,k}^v \\ P_{y,k}^v \\ \theta_{x,k}^v \end{bmatrix} + v_k \quad (21)$$

$$F_k = \begin{bmatrix} \frac{\partial f_1}{\partial x_1} & \cdots & \frac{\partial f_1}{\partial x_n} \\ \vdots & & \vdots \\ \frac{\partial f_m}{\partial x_1} & \cdots & \frac{\partial f_m}{\partial x_n} \end{bmatrix} = \begin{bmatrix} 1 & 0 & -u_{r,k}\sin\left(\theta_k + \frac{u_{\theta,k}}{2}\right) \\ 0 & 1 & u_{r,k}\cos\left(\theta_k + \frac{u_{\theta,k}}{2}\right) \\ 0 & 0 & 1 \end{bmatrix} \quad (22)$$

$$H_k = \begin{bmatrix} 1 & 0 & 0 \\ 0 & 1 & 0 \\ 0 & 0 & 1 \end{bmatrix}$$

where $F_k$ is the Jacobian matrix for the process model and $H_k$ is the Jacobian matrix for the measurement model. (23)

Using the EKF, predictions can be made as follow:

$$\widehat{x_k}^- = f(\widehat{x_{k-1}}, u_{k-1}) \quad (24)$$

$$P_k^- = F_k P_{k-1} F_k^T + Q_{k-1} \quad (25)$$

Allowing measurement to be provided as follow:

$$K_k = P_k^- H_k^T (H_k P_k^- H_k^T + R_k)^{-1} \quad (26)$$

$$x_k = \widehat{x_k}^- + K_k(y_k - h(\widehat{x_k}^-)) \quad (27)$$

$$P_k = (I - K_k H_k) P_k^- \quad (28)$$

where $P_k$ is the revised state covariance matrix, and $K_k$ is the Kalman gain, and $Q_k$ is a 3×3 covariance matrix for the process model, which quantifies the variance of wheel encoder and IMU's gyroscope measurements, and $R_k$ is a 3×3 covariance matrix for the measurement model, which quantifies the variance of the position and orientation measured by the VO module. $Q_k$ and $R_k$ are each 3×3 matrices in the Extended Kalman Filter (EKF) pipeline.

FIG. 9 illustrates an example flowchart for a process 900 of localizing a mobile robot in an environment in accordance with some embodiments. The process 900 is optionally performed by the onboard processing units of the mobile robot, in accordance with some embodiments. In some embodiments, the process 900 is performed by a server in communication with the mobile robot. In some embodiments, the process 900 is performed jointly by the mobile robot and a server in communication with the mobile robot over a network. For ease of description, the steps of the process 900 are described with respect to a mobile robot, which is non-limiting and may be understood to be performed by the server or jointly by the mobile robot and the server, in accordance with various embodiments.

As the first step, the mobile robot captures (902), by a camera, a plurality of image frames recorded in a first coordinate reference frame (e.g., first coordinate reference frame is a visual coordinate reference frame) at respective locations within a portion of the environment in a first time period.

The mobile robot then captures (904) by an inertial measurement unit disposed on the device, sets of inertial odometry data recorded in a second coordinate reference frame (e.g., the second coordinate reference frame is a world coordinate reference frame), the sets of inertial odometry data corresponding to the plurality of image frames at the respective locations, in the first time period (e.g., the plurality of image frames is collected at a different frequency compared to the sets of inertial odometry data, the IMU collects at a higher frequency than the camera). The mobile robot stores (906) in a buffer, a matching pair of an image frame (e.g., a respective image frame of the plurality of image frames) and a set of inertial odometry data that satisfies first criteria; (e.g., pairing a first frame of camera with a fifth set of IMU data to form one matching pair). In accordance with a determination that a threshold number of matching pairs of image frames and inertial odometry data have been stored) (908): the mobile robot determines (910) a rotational transformation matrix that corresponds to a relative rotation between the first coordinate reference frame and the second coordinate reference frame, and determines (912) a scale factor from the matching pairs, wherein the rotational transformation matrix defines an orientation of the device, and the scale factor and the rotational transformation matrix calibrate the plurality of image frames captured by the camera.

In some embodiments, the mobile robot further determines a translation transformation vector from the matching pairs, and wherein the rotational transformation matrix and the translation transformation vector define a transformation pose for transforming the first coordinate reference frame into the second coordinate reference frame.

In some embodiments, the scale factor and the translation transformation vector are solved as parameters to a least square problem.

In some embodiments, the mobile robot further determines a calibration quality for a respective image frame of the matching pairs by determining an error between an adjusted visual pose obtained through applying the scale factor, the rotation transformation matrix and the translation transformation vector to the respective image frame, and the set of inertial odometry data corresponding to the respective image frame.

In some embodiments, the mobile robot further captures an additional sequence of image frames, and an additional sequence of sets to determine an updated scale factor until the calibration quality meets a second threshold. In some embodiments, determining the rotational transformation matrix includes determining an inverse of a relative rotation between a body reference frame of the device and a camera reference frame of the camera.

In some embodiments, the first criteria includes a relative distance between two adjacent sets of the inertial odometry data being larger than a minimum distance and being smaller than a maximum distance (e.g., the first criteria includes a relative distance between the set of inertial odometry data (of the matching pair) and an adjacent set of inertial odometry data (e.g., a preceding set, such as the immediately preceding set)).

In some embodiments, the mobile robot further determines an optimized scale factor by determining a residual error in the scale factor (e.g., summed over a plurality of poses qualified for optimization) and wherein the optimized scale factor includes multiplying the residual error with the scale factor (e.g., further includes multiplying learning rate with the residual error and the scale factor; learning rate is set based on a noise level of the image frames and the sets of inertial odometry data).

In some embodiments, determining the residual error includes summing products of (i) relative translation between adjacent image frames and (ii) relative translation between adjacent sets of inertial odometry data.

In some embodiments, the optimized scale factor is determined in accordance with a determination that the residual error in the scale factor is larger than a threshold value and that a number of optimized pairs of image frame and inertial odometry data set satisfies a second threshold (e.g., the second threshold corresponds to a length of a sliding window for receiving the optimized pairs.)

In some embodiments, a respective image frame in the optimized pairs of image frame is obtained by applying the scale factor and the rotational transformation matrix and the translation transformation vector on the respective image frame captured by the camera; and wherein an optimized pair of image frame and an inertial odometry data set is stored in a sliding window in accordance with a determination that the optimized pair meets a second criterion (e.g., second criterion relates to relative angles and distance of consecutive poses).

Figure 10:
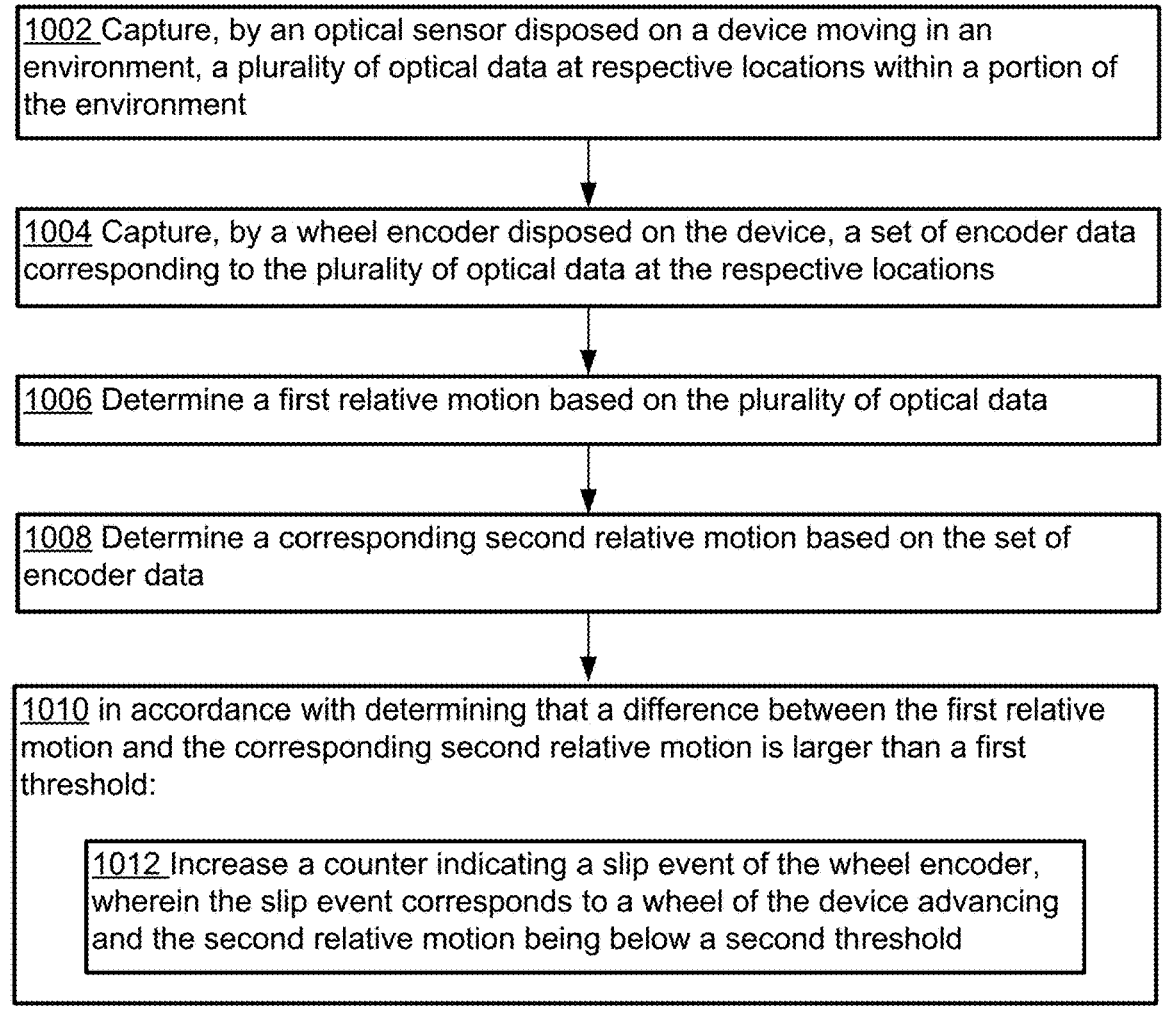
FIG. 10 illustrates an example flowchart for a process of detecting wheel slippage in accordance with some embodiments.

FIG. 10 illustrates an example flowchart for a process of detecting wheel slippage in accordance with some embodiments. The process 1000 is optionally performed by the onboard processing units of the mobile robot, in accordance with some embodiments. In some embodiments, the process 1000 is performed by a server in communication with the mobile robot. In some embodiments, the process 1000 is performed jointly by the mobile robot and a server in communication with the mobile robot over a network. For ease of description, the steps of the process 1000 are described with respect to a mobile robot, which is non-limiting and may be understood to be performed by the server or jointly by the mobile robot and the server, in accordance with various embodiments.

The mobile robot captures (1002), by an optical sensor disposed on a device moving in an environment, a plurality of optical data at respective locations within a portion of the environment.

The mobile robot captures (1004) by a wheel encoder disposed on the device, a set of encoder data corresponding to the plurality of optical data at the respective locations (e.g., corresponding can mean the optical data is measured at the same time points as the encoder data, or measured at different time points as the encoder data but within the same time period). The mobile robot determines (1006) a first relative motion based on the plurality of optical data. The mobile robot determines (1008) a corresponding second relative motion based on the set of encoder data.

In accordance with a determination that that a difference between the first relative motion and the corresponding second relative motion is larger than a first threshold (1010): the mobile robot increases (1012) a counter indicating a slip event of the wheel encoder, wherein the slip event corresponds to a wheel of the device advancing and the second relative motion being below a second threshold. {the wheel encoder counts a number of times a motor associated with the device has rotated; a slip event occurs when the device is stuck in a region (e.g., one location, or a limited range of locations) even after multiple rotations of the motor}.

In some embodiments, a state of the device is set to a first state when the counter is above a second threshold, and the mobile robot excludes the plurality of optical data from further processing when the state of the device is set to the first state (e.g., the second threshold specifies a lower limit of slip events that has to be detected within a time period before the state of the device is set to the slipping state).

In some embodiments, the optical sensor includes a camera and the optical data comprises image frames captured by the camera. In some embodiments, the mobile robot determines whether a jump in a position of the device occurs between two adjacent frames of the image frames captured by the camera.

In some embodiments, in accordance with a determination that the jump occurs: capturing an additional image frame by the camera until two adjacent frames of captured image frames do not exhibit the jump in the position of the device, prior to determining the first relative motion.

In some embodiments, the mobile robot further determines whether two adjacent frames of the image frames captured by the camera qualifies as valid measurements prior to calculating the first relative motion.

In some embodiments, the mobile robot further obtains wheel encoder readings between the two adjacent frames of captured image frames; determines a motion mode based on the wheel encoder readings; determines a feasible motion range according to the motion mode. In accordance with a determination that the first relative motion between the two adjacent frames is outside the feasible motion range: disqualifies the two adjacent frames of the image frames from being valid measurements; and captures an additional image frame by the camera until two adjacent frames of captured image frames contain relative motion that is within the feasible motion range.

In some embodiments, the motion mode includes one or more of a forward mode, a clockwise mode, a backward mode, and a counter-clockwise mode. In some embodiments, the optical sensor includes an optical tracking sensor and determining the first relative motion comprises integrating measurements captured by the optical tracking sensor. In some embodiments, the mobile robot captures, by a camera disposed on the device, a sequence of image frames corresponding to the sequence of optical data and the sequence of encode data recorded at the respective locations within the portion of the environment.

Figure 11:
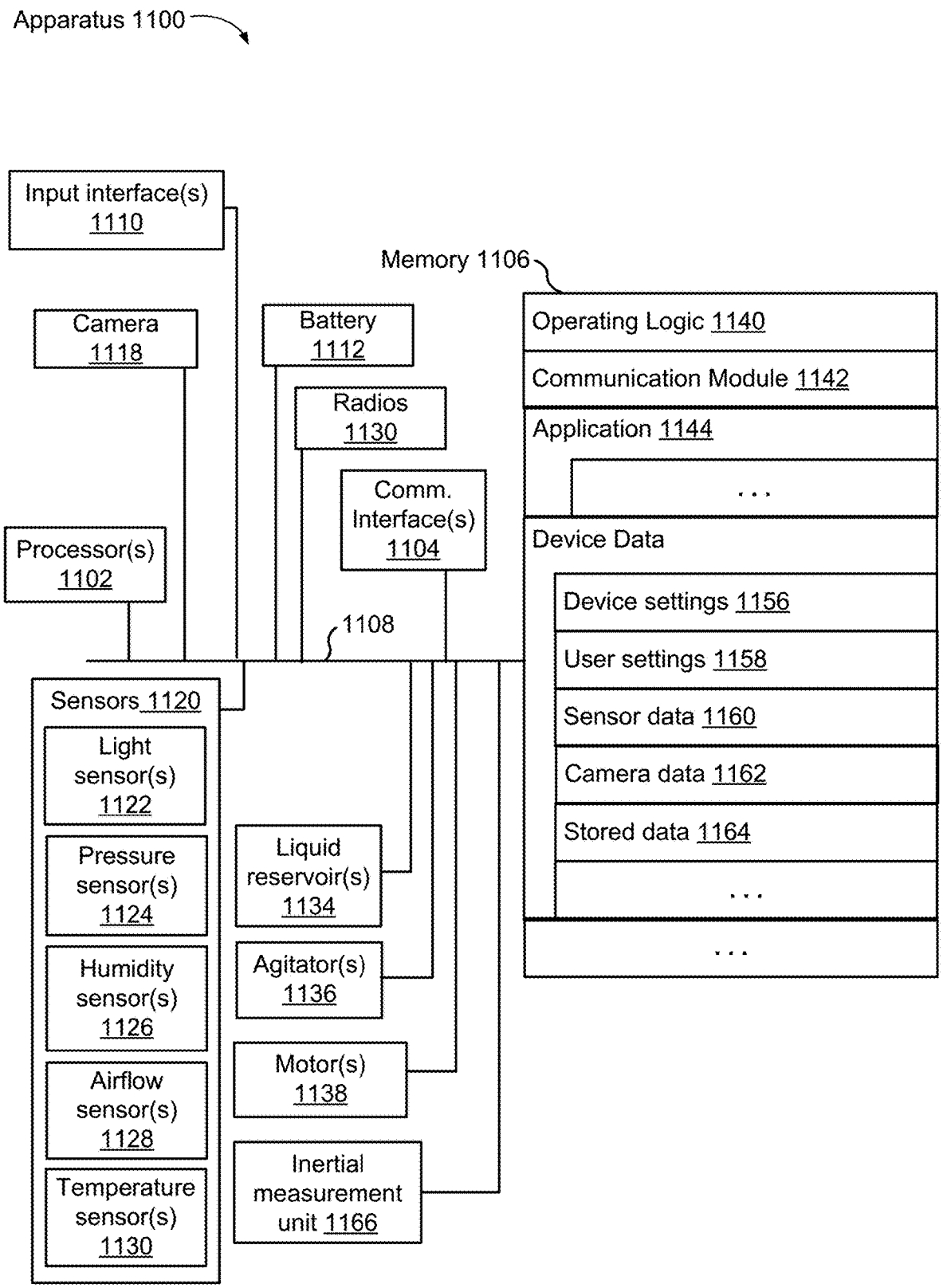
FIG. 11 is a block diagram of an electronic device that is configured to perform the methods described herein, in accordance with some embodiments.

FIG. 11 illustrates a block diagram of an apparatus 1100 in accordance with some embodiments. The apparatus 1100 includes a mobile robot 102, in some embodiments. In some embodiments, the apparatus 1100 includes a server in communication with the mobile robot. The apparatus 1100 is a representative of an electronic device that performs the process 1000 in FIG. 10, in accordance with some embodiments.

The apparatus 1100 includes one or more processor(s) 1102, one or more communication interface(s) 1104 (e.g., network interface(s)), memory 1106, and one or more communication buses 1108 for interconnecting these components (sometimes called a chipset).

In some embodiments, the apparatus 1100 includes input interface(s) 1110 that facilitates user input.

In some embodiments, the apparatus 1100 includes one or more camera 1118. In some embodiments, the camera 1118 is configured to capture images in color. In some embodiments, the camera 1118 is configured to capture images in black and white. In some embodiments, the camera 1118 captures images with depth information.

In some embodiments, the apparatus 1100 includes one or more inertial measurement units 1166. In some embodiments, the inertial measurement unit 1166 is configured to measure and report specific force, angular rate, and sometimes the orientation of the robot 102, using a combination of one or more of accelerometers, gyroscopes, and sometimes magnetometers.

In some embodiments, the apparatus 1100 includes a battery 1112. The apparatus 1100 also includes sensors 1120, such as light sensor(s) 1122, pressure sensor(s) 1124, humidity sensor(s) 1126, airflow sensor(s) 1128, and/or temperature sensor(s) 1130 to facilitate tasks and operations of the mobile robot (e.g., cleaning, delivery, etc.). In some embodiments, the apparatus 1100 also includes liquid reservoir(s) 1134, agitator(s) 1136, and/or motors 1138 to execute a cleaning task (e.g., sweeping, scrubbing, mopping, etc.).

In some embodiments, the apparatus 1100 includes radios 1130. The radios 1130 enable one or more communication networks, and allow the apparatus 1100 to communicate with other devices, such as a docking station, a remote control device, a server, etc. In some implementations, the radios 1130 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), software defined radio (SDR) etc.) custom or standard wired protocols (e.g., Ethernet, HomePlug, etc.), and/or any other suitable communication protocol, including communication protocols not yet developed as of the filing date of this document.

The memory 1106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1106, optionally, includes one or more storage devices remotely located from one or more processor(s) 1102. The memory 1106, or alternatively the non-volatile memory within the memory 1106, includes a non-transitory computer-readable storage medium. In some implementations, the memory 1106, or the non-transitory computer-readable storage medium of the memory 1106, stores the following programs, modules, and data structures, or a subset or superset thereof:

operating logic 1140 including procedures for handling various basic system services and for performing hardware dependent tasks;

a communication module 1142 (e.g., a radio communication module) for connecting to and communicating with other network devices (e.g., a local network, such as a router that provides Internet connectivity, networked storage devices, network routing devices, server systems, and/or other connected devices etc.) coupled to one or more communication networks via the communication interface(s) 1104 (e.g., wired or wireless);

application 1144 for performing tasks and self-locating, and for controlling one or more components of the apparatus 1100 and/or other connected devices in accordance with preset instructions.

device data 1138 for the apparatus 1100, including but not limited to:

device settings 1156 for the apparatus 1100, such as default options for performing tasks; and user settings 1158 for performing tasks;

sensor data 1160 that are acquired (e.g., measured) from the sensors 1120;

camera data 1162 that are acquired from the camera 1118; and stored data 1164. For example, in some embodiments, the stored data 1164 include the semantic and feature maps of the environment, camera pose and map points of stored keyframes, etc. in accordance with some embodiments.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1106 stores a subset of the modules and data structures identified above. Furthermore, the memory 1106 may store additional modules or data structures not described above. In some embodiments, a subset of the programs, modules, and/or data stored in the memory 1106 are stored on and/or executed by a server system, and/or by a mobile robot. Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first sensor could be termed a second sensor, and, similarly, a second sensor could be termed a first sensor, without departing from the scope of the various described implementations. The first sensor and the second sensor are both sensors, but they are not the same type of sensor.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated. The above clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application. The accompanying method claims present elements of the various steps in a sample order, and are not meant to be limited to the specific order or hierarchy presented.

What is claimed is:

1. A method, comprising:
  capturing, by a camera disposed on a device moving in an environment, a plurality of image frames recorded in a first coordinate reference frame at respective locations within a portion of the environment in a first time period;

capturing, by an inertial measurement unit disposed on the device, sets of inertial odometry data recorded in a second coordinate reference frame, the sets of inertial odometry data corresponding to the plurality of image frames at the respective locations, in the first time period;

storing in a buffer, a matching pair of an image frame and a set of inertial odometry data that satisfies first criteria;

in accordance with a determination that a threshold number of matching pairs of image frames and inertial odometry data have been stored:

determining a rotational transformation matrix that corresponds to a relative rotation between the first coordinate reference frame and the second coordinate reference frame;

determining a scale factor from the matching pairs of image frames, wherein the rotational transformation matrix defines an orientation of the device, and the scale factor and the rotational transformation matrix calibrate the plurality of image frames captured by the camera, wherein the scale factor is solved as a parameter to a least square problem based on the matching pairs of image frames and inertial odometry data;

determining a translation transformation vector from the matching pairs of image frames, and wherein the rotational transformation matrix and the translation transformation vector define a transformation pose for transforming the first coordinate reference frame into the second coordinate reference frame, wherein the translation transformation vector is referenced to the first coordinate reference frame when a respective image of the matching pairs of image frames is taken to reduce scale ambiguity associated with the respective image, multiplying the scale factor to the translation transformation vector, and further multiplying a pose of a body frame of the device referenced to a camera frame when the respective image of the matching pairs of image frames is taken.

2. The method of claim 1, wherein the translation transformation vector is solved as a parameter to a least square problem.

3. The method of claim 2, further comprising:
determining a calibration quality for a respective image frame of the matching pairs of image frames by determining an error between an adjusted visual pose obtained through applying the scale factor, the rotation transformation matrix and the translation transformation vector to the respective image frame, and the set of inertial odometry data corresponding to the respective image frame.

4. The method of claim 3, further comprising: capturing an additional sequence of image frames, and an additional sequence of sets to determine an updated scale factor until the calibration quality meets a second threshold.

5. The method of claim 1, wherein determining the rotational transformation matrix comprises determining an inverse of a relative rotation between a body reference frame of the device and a camera reference frame of the camera.

6. The method of claim 1, wherein the first criteria includes a relative distance between two adjacent sets of the inertial odometry data being larger than a minimum distance and being smaller than a maximum distance.

7. The method of claim 1, further comprising determining an optimized scale factor by determining a residual error in the scale factor wherein the optimized scale factor includes multiplying the residual error with the scale factor.

8. The method of claim 7, wherein determining the residual error comprises summing products of (i) relative translation between adjacent image frames and (ii) relative translation between adjacent sets of inertial odometry data.

9. The method of claim 7, wherein the optimized scale factor is determined in accordance with a determination that the residual error in the scale factor is larger than a threshold value and that a number of optimized pairs of image frame and inertial odometry data set satisfies a second threshold.

10. The method of claim 9, wherein a respective image frame in the optimized pairs of image frame is obtained by applying the scale factor and the rotational transformation matrix and a translation transformation vector on the respective image frame captured by the camera; and wherein an optimized pair of image frame and an inertial odometry data set is stored in a sliding window in accordance with a determination that the optimized pair meets a second criterion.

11. An electronic device, comprising:
one or more processing units;
memory; and
a plurality of programs stored in the memory that, when executed by the one or more processing units, cause the one or more processing units to perform operations comprising:

capturing, by a camera disposed on a device moving in an environment, a plurality of image frames recorded in a first coordinate reference frame at respective locations within a portion of the environment in a first time period;

capturing, by an inertial measurement unit disposed on the device, sets of inertial odometry data recorded in a second coordinate reference frame, the sets of inertial odometry data corresponding to the plurality of image frames at the respective locations, in the first time period;

storing in a buffer, a matching pair of an image frame and a set of inertial odometry data that satisfies first criteria;

in accordance with a determination that a threshold number of matching pairs of image frames and inertial odometry data have been stored:

determining a rotational transformation matrix that corresponds to a relative rotation between the first coordinate reference frame and the second coordinate reference frame;

determining a scale factor from the number of matching pairs, wherein the rotational transformation matrix defines an orientation of the device, and the scale factor and the rotational transformation matrix calibrate the plurality of image frames captured by the camera, wherein the scale factor is solved as a parameter to a least square problem based on the matching pairs of image frames and inertial odometry data;

determining a translation transformation vector from the matching pairs of image frames, and wherein the rotational transformation matrix and the translation transformation vector define a transformation pose for transforming the first coordinate reference frame into the second coordinate reference frame, wherein the translation transformation vector is referenced to the first coordinate reference frame when a respective image of the matching pairs of image frames is taken to reduce scale ambiguity associated with the respective image, multiplying the scale factor to the translation transformation vector, and further multiplying a pose of a body frame of the device referenced to a camera frame when the respective image of the matching pairs of image frames is taken.

12. The electronic device of claim 11, wherein the translation transformation vector is solved as a parameter to a least square problem.

13. The electronic device of claim 11, wherein the plurality of programs causes the one or more processing units to perform operations further comprising determining an optimized scale factor by determining a residual error in the scale factor wherein the optimized scale factor includes multiplying the residual error with the scale factor.

14. The electronic device of claim 11, wherein determining the rotational transformation matrix comprises determining an inverse of a relative rotation between a body reference frame of the device and a camera reference frame of the camera.

15. A non-transitory computer readable storage medium storing a plurality of programs for execution by an electronic device having one or more processing units, wherein the plurality of programs, when executed by the one or more processing units, cause the processing units to perform operations comprising:
 capturing, by a camera disposed on a device moving in an environment, a plurality of image frames recorded in a first coordinate reference frame at respective locations within a portion of the environment in a first time period;
 capturing, by an inertial measurement unit disposed on the device, sets of inertial odometry data recorded in a second coordinate reference frame, the sets of inertial odometry data corresponding to the plurality of image frames at the respective locations, in the first time period;
 storing in a buffer, a matching pair of an image frame and a set of inertial odometry data that satisfies first criteria;
 in accordance with a determination that a threshold number of matching pairs of image frames and inertial odometry data have been stored:
  determining a rotational transformation matrix that corresponds to a relative rotation between the first coordinate reference frame and the second coordinate reference frame;
  determining a scale factor from the number of matching pairs, wherein the rotational transformation matrix defines an orientation of the device, and the scale factor and the rotational transformation matrix calibrate the plurality of image frames captured by the camera, wherein the scale factor is solved as a parameter to a least square problem based on the matching pairs of image frames and inertial odometry data;
 determining a translation transformation vector from the matching pairs of image frames, and wherein the rotational transformation matrix and the translation transformation vector define a transformation pose for transforming the first coordinate reference frame into the second coordinate reference frame, wherein the translation transformation vector is referenced to the first coordinate reference frame when a respective image of the matching pairs of image frames is taken to reduce scale ambiguity associated with the respective image,
 multiplying the scale factor to the translation transformation vector, and
 further multiplying a pose of a body frame of the device referenced to a camera frame when the respective image of the matching pairs of image frames is taken.

16. The non-transitory computer readable storage medium of claim 15, wherein the translation transformation vector is solved as a parameter to a least square problem.

17. The non-transitory computer readable storage medium of claim 15, wherein the plurality of programs causes the one or more processing units to perform operations further comprising determining an optimized scale factor by determining a residual error in the scale factor wherein the optimized scale factor includes multiplying the residual error with the scale factor.

* * * * *